US012162148B2

(12) United States Patent
Hasegawa et al.

(10) Patent No.: US 12,162,148 B2
(45) Date of Patent: Dec. 10, 2024

(54) CONTROL DEVICE, CONTROL SYSTEM, MECHANICAL APPARATUS SYSTEM, AND CONTROLLING METHOD

(71) Applicant: KAWASAKI JUKOGYO KABUSHIKI KAISHA, Kobe (JP)

(72) Inventors: Shogo Hasegawa, Kobe (JP); Tetsuya Yoshida, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 312 days.

(21) Appl. No.: 17/613,111

(22) PCT Filed: May 28, 2020

(86) PCT No.: PCT/JP2020/021235
§ 371 (c)(1),
(2) Date: Nov. 22, 2021

(87) PCT Pub. No.: WO2020/241796
PCT Pub. Date: Dec. 3, 2020

(65) Prior Publication Data
US 2022/0212340 A1 Jul. 7, 2022

(30) Foreign Application Priority Data
May 28, 2019 (JP) ................. 2019-099548

(51) Int. Cl.
*G06N 3/044* (2023.01)
*B25J 3/00* (2006.01)
(Continued)

(52) U.S. Cl.
CPC ............... *B25J 9/161* (2013.01); *B25J 9/163* (2013.01); *G06N 20/00* (2019.01)

(58) Field of Classification Search
CPC . B25J 9/161; B25J 9/163; B25J 9/1664; B25J 3/00; B25J 13/00; B25J 9/1602;
(Continued)

(56) References Cited

U.S. PATENT DOCUMENTS 10,926,408 B1 * 2/2021 Vogelsong ............... B25J 9/163
11,312,581 B2 * 4/2022 Huang ................... B25J 9/1612
(Continued)

FOREIGN PATENT DOCUMENTS

JP    H07-319558 A    12/1995
JP    2009-211294 A    9/2009
(Continued)

*Primary Examiner* — Adam R Mott
*Assistant Examiner* — Byron Xavier Kasper
(74) *Attorney, Agent, or Firm* — METROLEX IP LAW GROUP, PLLC; Robert L. Scott, Esq.

(57) ABSTRACT

A control device includes a motion controller configured to control operation of a mechanical apparatus according to an operational command, a correction controller configured to correct the operation of the mechanical apparatus according to manipulational information outputted from a manipulating device, a memory part configured to store first operational information indicative of the operation of the mechanical apparatus, and correctional information indicative of the correction made by the correction controller, and a learning part configured to carry out machine learning using the first operational information and the correctional information corresponding to the first operational information. The motion controller controls the operation of the mechanical apparatus according to the operational command based on the command of the learning part, and the manipulating device outputs the manipulational information based on second operational information indicative of motion of the manipulating device.

20 Claims, 8 Drawing Sheets

(51) Int. Cl.
  *B25J 9/16* (2006.01)
  *B25J 13/00* (2006.01)
  *B25J 13/08* (2006.01)
  *G05B 19/409* (2006.01)
  *G05B 19/42* (2006.01)
  *G06N 3/08* (2023.01)
  *G06N 20/00* (2019.01)

(58) Field of Classification Search
  CPC ...... B25J 9/1651; B25J 13/087; B25J 13/088; B25J 9/00; B25J 9/16; B25J 9/0081; B25J 11/0075; B25J 11/008; G06N 20/00; G06N 3/044; G06N 3/08; G05B 19/409; G05B 2219/39271; G05B 2219/39443; G05B 19/42
  See application file for complete search history.

(56) References Cited

U.S. PATENT DOCUMENTS

| | | | | |
|---|---|---|---|---|
| 11,354,509 | B2* | 6/2022 | Hermann | G06N 3/08 |
| 11,494,632 | B1* | 11/2022 | Bai | G06N 3/09 |
| 2011/0015787 | A1* | 1/2011 | Tsusaka | G05B 19/423 |
| | | | | 901/4 |
| 2014/0067128 | A1 | 3/2014 | Kowalski et al. | |
| 2017/0157767 | A1 | 6/2017 | Takamizawa | |
| 2018/0154519 | A1* | 6/2018 | Lin | B25J 13/085 |
| 2018/0207797 | A1* | 7/2018 | Yamaoka | B25J 9/163 |
| 2018/0243901 | A1 | 8/2018 | Hashimoto et al. | |
| 2018/0354126 | A1* | 12/2018 | Ueda | B25J 9/163 |
| 2019/0210228 | A1 | 7/2019 | Kogan | |
| 2020/0094401 | A1* | 3/2020 | Cheng | B25J 9/163 |
| 2020/0346347 | A1* | 11/2020 | Sankai | B25J 13/082 |
| 2021/0154826 | A1 | 5/2021 | Watanabe et al. | |

FOREIGN PATENT DOCUMENTS

| | | |
|---|---|---|
| JP | 2014-50950 A | 3/2014 |
| JP | 2017-107902 A | 6/2017 |
| WO | 2017/033356 A1 | 3/2017 |
| WO | 2017/220605 A1 | 12/2017 |
| WO | 2019/044766 A1 | 3/2019 |

* cited by examiner

CONTROL DEVICE, CONTROL SYSTEM, MECHANICAL APPARATUS SYSTEM, AND CONTROLLING METHOD

CROSS-REFERENCE TO RELATED APPLICATIONS

This application is a national stage entry of International Application No. PCT/JP2020/021235, filed on May 28, 2020, which claims priority based on the Article 8 of Patent Cooperation Treaty from the prior Japanese Patent Application No 2019-099548, filed on May 28, 2019, the entire contents of all of which are incorporated herein by reference.

TECHNICAL FIELD

The present disclosure relates to a control device, a control system, a mechanical apparatus system, and a controlling method.

BACKGROUND ART

Conventionally, the art is known for automating a human work by causing a machine learning model including a neural network to carry out machine learning of a work which is performed by a person, and using a mechanical apparatus which is controlled using the machine learning model. For example, Patent Document 1 discloses a robot camera control device which controls a robot camera using the neural network. The robot camera control device includes the robot camera, a photographic subject detecting device which detects the position of a photographic subject, a manipulator of the robot camera, and a learning controller which has the neural network and controls an imaging operation of the robot camera. The robot camera images the photographic subject according to the operation to the manipulator, and outputs state data indicative of a state of the imaging operation to the learning controller. The learning controller causes the neural network to learn the state data by using the position data of the photographic subject detected by the photographic subject detecting device. During an automatic control, the learning controller uses the output of the neural network obtained by inputting the position data of the photographic subject, for the control of the robot camera.

REFERENCE DOCUMENT OF CONVENTIONAL ART

Patent Document

[Patent Document 1] JP2009-211294A

DESCRIPTION OF THE DISCLOSURE

Problem(s) to be Solved by the Disclosure

According to the art described in Patent Document 1, since the robot camera is controlled only by the neural network during the automatic control, it is necessary to improve the accuracy of the neural network in order to improve the imaging quality. Further, although the state of the imaging operation of the robot camera varies according to the position of the photographic subject, the positions of the photographic subject are infinite. For this reason, an enormous amount of learning data is required for the learning of the neural network. Therefore, it is difficult to achieve the automation of the imaging by the robot camera using the machine learning within a short period of time.

One purpose of the present disclosure is to provide a control device, a control system, a mechanical apparatus system, and a controlling method, capable of shortening time required for machine learning.

SUMMARY OF THE DISCLOSURE

In order to achieve the purpose, a control device according to one aspect of the present disclosure is a control device for a mechanical apparatus which includes a motion controller configured to control operation of the mechanical apparatus according to an operational command to operate the mechanical apparatus, a correction controller configured to correct the operation of the mechanical apparatus according to manipulational information outputted from a manipulating device configured to operate the mechanical apparatus, a memory part configured to store first operational information indicative of the operation of the mechanical apparatus, and correctional information indicative of the correction made by the correction controller, and a learning part configured to carry out machine learning using the first operational information and the correctional information corresponding to the first operational information, where the first operational information is used as input data and a command corresponding to the first operational information is used as output data. The motion controller controls the operation of the mechanical apparatus according to the operational command based on the command of the learning part, and the manipulating device outputs the manipulational information based on second operational information indicative of motion of the manipulating device.

A control system according to another aspect of the present disclosure includes the control device according to the one aspect of the present disclosure, and the manipulating device configured to manipulate the mechanical apparatus.

A mechanical apparatus system according to another aspect of the present disclosure includes the control device according to the one aspect of the present disclosure, the mechanical apparatus, and the manipulating device configured to manipulate the mechanical apparatus.

A controlling method according to another aspect of the present disclosure includes the steps of operating a mechanical apparatus according to an operational command to operate the mechanical apparatus, correcting the operation of the mechanical apparatus according to manipulational information outputted from a manipulating device configured to operate the mechanical apparatus, acquiring first operational information indicative of the operation of the mechanical apparatus, and correctional information indicative of the correction of the operation of the mechanical apparatus, causing a learning model to carry out machine learning using the first operational information and the correctional information corresponding to the first operational information, inputting the first operational information into the learning model and causing the learning model to output a command corresponding to the first operational information, and operating the mechanical apparatus according to the operational command based on the command of the learning model. The manipulational information is information based on second operational information indicative of motion of the manipulating device.

Effect of the Disclosure

According to the present disclosure, time required for machine learning can be shortened.

MODES FOR CARRYING OUT THE DISCLOSURE

Figure 1:
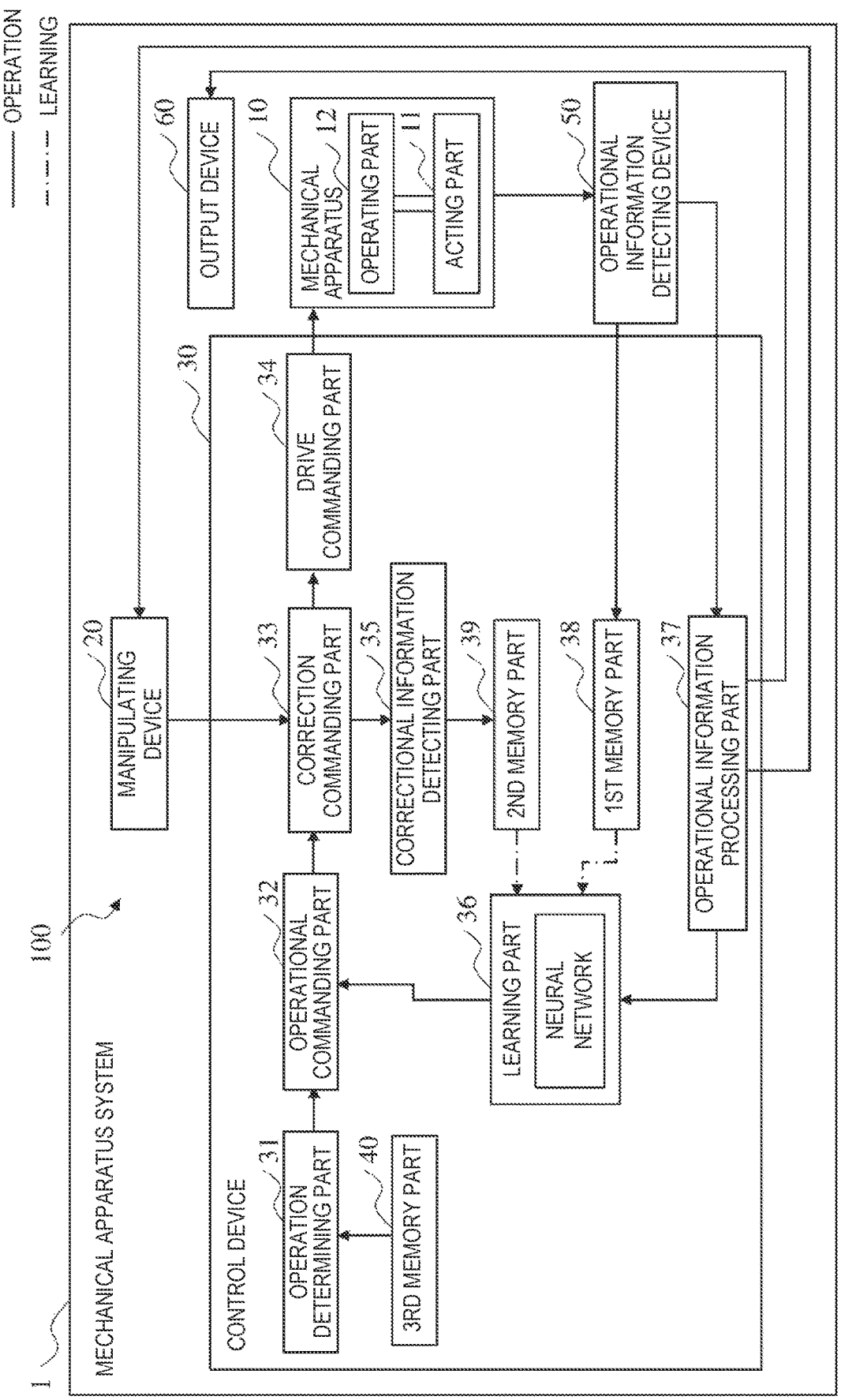
FIG. 1 is a functional block diagram illustrating one example of a configuration of a mechanical apparatus system according to one embodiment.

Hereinafter, one embodiment of the present disclosure is described with reference to the drawings. Note that each embodiment which will be described below is to illustrate a comprehensive or concrete example. Components which are not cited in the independent claim that is the broadest concept among components in the following embodiments will be described as arbitrary components. Each drawing in the accompanying drawings is a schematic drawing, and is not necessarily illustrated exactly. Moreover, in each drawing, the same reference characters are assigned to substantially the same components, and therefore, redundant description may be omitted or simplified. The term "device" or "apparatus" as used in this specification and the appended claims may mean a system including a plurality of devices or apparatuses, other than meaning a sole device or apparatus.

Embodiment

A mechanical apparatus system 1 according to one embodiment is described. FIG. 1 is a functional block diagram illustrating one example of a configuration of the mechanical apparatus system 1 according to this embodiment. In FIG. 1, solid-line arrows indicate flows of a command, data, and information for operating a mechanical apparatus 10, and broken-line arrows indicate flows of command, data, and information for causing a learning part 36 to learn. This is similar in the following functional block diagrams.

1-1. Configuration

1-1-1. Mechanical Apparatus System

As illustrated in FIG. 1, the mechanical apparatus system 1 according to this embodiment includes the mechanical apparatus 10, a manipulating device 20, a control device 30, an operational information detecting device 50, and an output device 60. The mechanical apparatus 10 includes an acting part 11 which applies operation to an object to be processed, and an operating part 12 which moves the acting part 11 so as to apply the operation. The manipulating device 20 and the control device 30 constitute a control system 100 for controlling the mechanical apparatus 10.

The manipulating device 20 is a device for manipulating the mechanical apparatus 10, and outputs it to the control device 30 manipulational information that is information inputted into the manipulating device 20. The control device 30 controls the entire operation of the mechanical apparatus 10. The operational information detecting device 50 detects operational information indicative of operations of the acting part 11 and the operating part 12 of the mechanical apparatus 10, and outputs it to the control device 30. For example, the operational information detecting device 50 may be provided with various sensors which detect, as the operational information, information including the position and the posture of the acting part 11, a force which the acting part 11 applies to the object, an image of the object, vibration, impact, light, sound, temperature, humidity, atmospheric pressure, etc. at the acting part 11. The control device 30 outputs the operational information to the manipulating device 20 and the output device 60 for feedback and presentation of the state of operation. The output device 60 converts the operational information into visual and audio information etc., and presents it to an operator of the manipulating device 20. For example, an imaging device, such as a camera, may be disposed at a position separated from the mechanical apparatus 10, and the control device 30 may output an image captured by the imaging device to the output device 60. Such an output device 60 can present the operator the state of the mechanical apparatus 10. Although the example of the output device 60 is a liquid crystal display, and an organic or inorganic electro-luminescence (EL) display, it is not limited to these. The output device 60 may be provided with a speaker which emits sound.

Although not limited to this configuration, in this embodiment, the mechanical apparatus system 1 may cause the mechanical apparatus 10 to perform operation in a manual operating mode and operation in an automatic operating mode. The manual operating mode and the automatic operating mode in this embodiment do not include instructing (may be referred to as "teaching") operation in which operation, such as a work, is taught to the mechanical apparatus 10. In the manual operating mode, the mechanical apparatus 10 performs operation according to the manipulation inputted into the manipulating device 20 by the operator (i.e., the operation which traces the manipulation). The mechanical apparatus 10 is manually operated by the operator.

In the automatic operating mode, the mechanical apparatus 10 performs operation according to a given operation set beforehand. The mechanical apparatus 10 carries out an automatic operation which automatically performs the given operation according to its control program. The given operation may be an individual operation, such as a horizontal movement, a vertical movement and a rotation, or may be a complex operation in which a series of a plurality of individual operations are combined together according to an execution sequence. Note that the individual operation may include a sole operation, or may include two or more operations. Examples of the complex operation are works, such as moving the object by the acting part 11 while holding the object, cutting the object by the acting part 11, joining two or more objects by the acting part 11, excavating by the acting part 11. In this embodiment, the mechanical apparatus system 1 can accept a correction of the operations of the acting part 11 and the operating part 12 by using the manipulating device 20 during the automatic operation. The mechanical apparatus system 1 corrects the operations of the acting part 11 and the operating part 12 by applying a corrective operation corresponding to the manipulation inputted into the manipulating device 20. Further, the automatic operating mode may include a combination of the automatic operation and the manual operation so that a part of the complex operation may be manually operated.

1-1-2. Mechanical Apparatus

As illustrated in FIG. 1, the mechanical apparatus 10 may be a device which operates with power. The mechanical apparatus 10 includes, for example, construction machinery, a tunnel boring machine, a crane, a cargo conveyance vehicle, and robots for various applications, such as industrial robots. For example, if the mechanical apparatus 10 is a backhoe of the construction machinery, a shovel of the backhoe corresponds to the acting part 11, and an arm corresponds to the operating part 12. The control device 30 controls a hydraulic system which operates the arm. If the mechanical apparatus 10 is the tunnel boring machine, cutting blades of the tunnel boring machine correspond to the acting part 11, and an actuator which actuates the cutting blades corresponds to the operating part 12. The control device 30 controls the operation of the actuator etc. If the mechanical apparatus 10 is the cargo conveyance vehicle, a placing part or gripper, such as a fork of a cargo handling device of the cargo conveyance vehicle corresponds to the acting part 11, and drives of the cargo handling device and a conveyance cart correspond to the operating part 12. The control device 30 controls the operation of the drives of the cargo handling device and the conveyance cart. If the mechanical apparatus 10 is the industrial robot, a robotic arm of the robot corresponds to the operating part 12, and an end effector at a tip end of the robotic arm corresponds to the acting part 11. The control device 30 controls the operation of drives etc. of the robotic arm and the end effector. The power may be any kind of power. Examples of the type of the power are an electric motor, an internal combustion engine, steam, hydraulic, and pneumatic. The control may be any kind of control. Examples of the type of the control are an electric control, a hydraulic control, a fluid pressure control, and a pneumatic control.

1-1-3. Manipulating Device

As illustrated in FIG. 1, the manipulating device 20 converts the input by the operator into information corresponding to this input, and outputs it to the control device 30 as manipulational information. For example, the manipulating device 20 converts the input by the operator into a signal corresponding to this input, and outputs it to the control device 30. In this embodiment, the manipulating device 20 is configured to be freely movable in arbitrary directions in a three-dimensional space, without being fixed to other objects, such as the mechanical apparatus 10. Note that the manipulating device 20 may be configured to be freely movable in arbitrary directions in a two-dimensional plane or on a one-dimensional straight line. The manipulating device 20 is configured to be gripped by the operator's hand. For this reason, the operator can put the manipulating device 20 in arbitrary postures by moving the gripping manipulating device 20 in arbitrary directions. The manipulating device 20 is configured to communicate with the control device 30 wiredly or wirelessly. The wired and wireless communications may be any kind of communications.

Although not limited to this configuration, the manipulating device 20 may be a device having a similar configuration to a general-purpose device, such as a game controller for a home video game machine, a remote control, or a smartphone, or may be a device for exclusive use, for example. For example, if the mechanical apparatus 10 is the industrial robot, the device for exclusive use may be a device corresponding to a function of the end effector. If the end effector is a spray gun for painting, the manipulating device 20 may be a gun-shaped device.

In this embodiment, the manipulating device 20 includes an inertial measurement unit (IMU) (not illustrated). The inertial measurement unit includes a 3-axis acceleration sensor and a 3-axis angular velocity sensor, and the manipulating device 20 outputs to the control device 30 the manipulational information based on measurement data of the acceleration and the angular velocity in the three axial directions which are measured by the inertial measurement unit. Note that the manipulating device 20 may output the measurement data itself to the control device 30. According to the measurement data, such as the acceleration and the angular velocity in the three axial directions, various information indicative of the motion and the applied force of the manipulating device 20, such as the position, posture, movement, moving speed, acceleration, and force are detectable. Such a manipulating device 20 outputs the manipulational information based on manipulation operational information that is information indicative of motion of the manipulating device 20.

Further, in this embodiment, the manipulating device 20 includes a haptics device (not illustrated) which gives the operator a feedback of the operating state of the mechanical apparatus 10 which operates according to the manipulational information, as a tactile sense. The haptics device receives the operational information on the mechanical apparatus 10 from the operational information detecting device 50 via the control device 30, and gives the operator the feedback of the operating state of the mechanical apparatus 10 based on this operational information, as the tactile sense.

Here, the operational information includes operational data. The operational data includes at least one of force data indicative of a force which the acting part 11 of the mechanical apparatus 10 applies to the object (i.e., a force acting on the work environment) and position data indicative of the position of the acting part 11 during operation. In this embodiment, the operational data includes both the data. The force data may be time series data which includes a magnitude of the force and time at which this force occurs so as to associate them with each other. The position data may be time series data which includes information on the position and time of this position so as to associate them with each other. The operational data including the force data and the position data may be time series data which includes the force magnitude, the time at which this force occurs, the information on the position, and the time of this position so as to associate them with each other. The position of the acting part 11 may include the posture of the acting part 11 in a three-dimensional space, in addition to the position of the acting part 11 in the three-dimensional space. In this specification and the claims, the "position" includes at least the position in the three-dimensional space among the position in the three-dimensional space and the posture in the three-dimensional space.

The reason why the operational information includes the operational data as essential information is that the control device 30 controls the operation of the mechanical apparatus 10 by controlling at least one of the "force" which the acting part 11 makes it act on the work environment, and the "position" of the acting part 11 during operation. "The operational command" in this embodiment includes at least one of a force command that is a command for instructing a target value or a correction value of the "force," and a position command that is a command for instructing a target value or a correction value of the "position."

The operational information may include, as information other than the operational data, image picture data of the object to which the acting part 11 applies the operation, vibration data, impact data, light data, sound data, temperature data, humidity data, and pressure data such as atmospheric pressure which occurs in the acting part 11. At least the operational data among the operational information is sent to the manipulating device 20.

For example, the haptics device includes an actuator, a controller, and a driver. The actuator includes an eccentric motor, a linear resonance actuator, and a piezo, which give the operator a tactile sense. The controller may control the actuator via the driver and may have similar configuration to the control device 30 (described later). The driver constitutes an interface between the actuator and the controller. The detailed configuration of the haptics device is disclosed in JP4111278B2 and JP2019-60835A, and since it is known, the detailed description is omitted. For example, the haptics device can give the operator a tactile sense in a state where the operator is gripping the manipulating device 20 in the air. Examples of such a tactile sense are a feel which the operator pushes by himself/herself, a feel which the operator pulls by himself/herself, a feel which the operator is pulled from the outside, a feel which the operator is pushed from the outside, a feel of expansion, a feel of oppression, a texture indicative of the surface roughness of the object, and a feel of pressure indicative of the hardness of the object.

1-1-4. Control Device

The control device 30 illustrated in FIG. 1 includes an arithmetic unit having a processor and a memory. The memory includes a storage device such as a semiconductor memory such as a volatile memory and a nonvolatile memory, a hard disc drive (HDD) and a SSD (Solid State Drive). For example, the function of the arithmetic unit may be implemented by a computer system (not illustrated) including a processor such as a CPU (Central Processing Unit), a volatile memory such as a RAM (Random Access Memory), and a nonvolatile memory such as a ROM (Read-Only Memory). A part or all of the function of the arithmetic unit may be implemented by the CPU executing a program recorded on the ROM by using the RAM as a work area. Note that a part or all of the function of the arithmetic unit may be implemented by the computer system described above, or may be implemented by hardware circuitry for exclusive use, such as an electronic circuit or an integrated circuit, or may be implemented by a combination of the computer system and the hardware circuitry which are described above. The control device 30 may perform each processing by a centralized control of a sole arithmetic unit, or may perform each processing by a distributed control of a collaboration of a plurality of arithmetic units.

The control device 30 may include a computer apparatus, such as a computer and a personal computer. Alternatively, the control device 30 may include a microcontroller, an MPU (Micro Processing Unit), an LSI (Large Scale Integration), a system LSI, a PLC (Programmable Logic Controller), and a logical circuit, etc. A plurality of functions of the control device 30 may be implemented by being formed in individual chips, respectively, or may be implemented by being formed in one chip so as to include a part or all of the functions. The circuit may be a general-purpose circuit, or may be a circuit for exclusive use. As the LSI, an FPGA (Field Programmable Gate Array) which can be programmed after a production of the LSI, a reconfigurable processor which is reconfigurable of the connection and/or the setup of a circuit cell inside the LSI, or an ASIC (Application Specific Integrated Circuit) in which circuits for a plurality of functions are integrated in one for a particular application may be utilized.

The control device 30 includes, as functional components, an operation determining part 31, an operational commanding part 32, a correction commanding part 33, a drive commanding part 34, a correctional information detecting part 35, the learning part 36, an operational information processing part 37, a first memory part 38, a second memory part 39, and a third memory part 40. The operation determining part 31, the operational commanding part 32, the correction commanding part 33, the drive commanding part 34, the correctional information detecting part 35, the learning part 36, and the operational information processing part 37 are functional blocks which are implemented by the computer system, the hardware circuitry, or the combination of the computer system and the hardware circuitry of the arithmetic unit described above. The first memory part 38, the second memory part 39, and the third memory part 40 are functional blocks implemented by the storage device of the arithmetic unit described above. In this embodiment, the operation determining part 31, the operational commanding part 32, the correctional information detecting part 35, and the learning part 36 normally function only in the automatic operating mode, and the correction commanding part 33, the drive commanding part 34, and the operational information processing part 37 normally function in both the automatic operating mode and the manual operating mode.

The operation determining part 31 determines a given operation to be performed by the mechanical apparatus 10, and outputs the operational information on the given operation (hereinafter, may also be referred to as the "determined operational information") to the operational commanding part 32. The operation determining part 31 accepts a command for the given operation to be performed by the mechanical apparatus 10 via the manipulating device 20 or other input devices of the mechanical apparatus system 1. Further, the operation determining part 31 extracts the operational information corresponding to the accepted given operation as the determined operational information from the third memory part 40, and outputs it to the operational commanding part 32. The given operation to be performed by the mechanical apparatus 10 may be an individual operation, or may be a complex operation.

The third memory part 40 stores the given operation which is executable by the mechanical apparatus 10 and the operational information on the given operation so as to associate them with each other. The operational information on the given operation is set beforehand and stored in the third memory part 40. In a case of the complex operation, the operational information may be set for each individual operation. For example, the operational information on each individual operation may be set by setting beforehand the target values of the force and the position of the acting part 11. Alternatively, the operational information on each individual operation may be set in the manual operating mode by using the operational information which can be acquired as a result of operating the mechanical apparatus 10 via the manipulating device 20. Alternatively, the operational information on each individual operation may be set by using the operational information which can be acquired as a result of actually operating the mechanical apparatus 10 in the automatic operating mode.

The operational commanding part 32 uses the determined operational information determined by the operation determining part 31 to generate the operational command for causing the mechanical apparatus 10 to perform operation corresponding to this determined operational information (hereinafter, may also be referred to as the "executing operational command"), and outputs it to the correction commanding part 33. The operational commanding part 32 is configured to receive output data from the learning part 36. This output data is a command outputted from the learning part 36 when the operational information on the mechanical apparatus 10 is inputted as input data (hereinafter, may also be referred to as the "executing operation correction command"). Although not limited to this configuration, in this embodiment, the executing operation correction command is the operational command. When the operational commanding part 32 receives the executing operation correction command from the learning part 36, it generates the executing operational command by correcting the operational command for performing the determined operational information (hereinafter, may also be referred to as the "determined operational command") by using the executing operation correction command. At this time, the operational commanding part 32 adds the corresponding executing operation correction command to the determined operational command, or replaces the determined operational command by the executing operation correction command corresponding to the determined operational command. When the operational commanding part 32 does not receive the executing operation correction command, it uses the determined operational command as the executing operational command. Note that the executing operation correction command corresponding to the determined operational command is the output data of the learning part 36 when the operational information on the mechanical apparatus 10 immediately before performing the operation of this determined operational command is used as the input data.

The correction commanding part 33 generates a corrected operational command that is an operational command after correction by correcting the executing operational command received from the operational commanding part 32 according to the manipulational information outputted from the manipulating device 20, and outputs it to the drive commanding part 34. For example, when the input to the manipulating device 20 is performed in the automatic operating mode, the correction commanding part 33 generates the corrected operational command by correcting the executing operational command, and if there is no input to the manipulating device 20, it determines the executing operational command as the corrected operational command During the correction of the executing operational command, the correction commanding part 33 generates an operational command for causing the acting part 11 to perform the operation corresponding to the manipulational information (hereinafter, may also be referred to as the "manipulation operational command"). The correction commanding part 33 generates the corrected operational command by adding the executing operational command and the operation operational command together. The corrected operational command is an operational command to which the manipulational information is reflected. Further, in the manual operating mode, when the input to the manipulating device 20 is performed, the correction commanding part 33 generates the operational command according to the manipulational information corresponding to the input described above, and outputs it to the drive commanding part 34.

In the manual operating mode, the correction commanding part 33 generates the manipulation operational command corresponding to the manipulational information, similar to the automatic operating mode. The correction commanding part 33 outputs the manipulation operational command to the drive commanding part 34 as the operational command Note that, although in this embodiment the correction commanding part 33 receives the operational information from the manipulating device 20 and generates the manipulation operational command, the manipulating device 20 may output the manipulation information to the operational commanding part 32. Then, the operational commanding part 32 may output the operational command corresponding to the manipulation information to the correction commanding part 33.

The drive commanding part 34 controls the operation of the mechanical apparatus 10 according to the operational command received from the correction commanding part 33. The drive commanding part 34 controls the operation of each drive of the mechanical apparatus 10 to cause the acting part 11 to perform the operation corresponding to this operational command. The drive commanding part 34 generates drive data including the command value for causing the drive to drive in order to perform the operation described above, and outputs it to each drive. Here, the operational commanding part 32 and the drive commanding part 34 constitute a "motion controller," and the correction commanding part 33 and the drive commanding part 34 constitute a "correction controller."

As described above, in this embodiment, the "commands" can be added to each other or subtracted from each other, and the "operational command" and the "operational data" can be added to each other or subtracted from each other.

The operational information processing part 37 receives the operational information on the mechanical apparatus 10 from the operational information detecting device 50, and outputs this operational information to the learning part 36, the manipulating device 20, and the output device 60. Note that, although the operational information processing part 37 outputs the operational information to the learning part 36, the manipulating device 20, and the output device 60 in the automatic operating mode, and outputs the operational information to the manipulating device 20 and the output device 60 in the manual operating mode, it is not limited to this configuration. Here, the operational information processing part 37 is one example of the processing part.

The correction information detecting part 35 detects correctional information indicative of the correction made by the correction commanding part 33, and stores it in the second memory part 39. In detail, when the correction of the executing operational command is made by the correction commanding part 33, the correctional information detecting part 35 detects the corrected operational command generated by the correction commanding part 33 as the correctional information. Further, when the correction of the executing operational command is not made by the correction commanding part 33, the correctional information detecting part 35 detects the executing operational command which has not been corrected, as the correctional information. The correction information detecting part 35 may associate the corrected operational command or the executing operational command with an issued time which is time at which this operational command is issued, and may generate time series data of the operational command. In this case, the correctional information detecting part 35 may associate the target value of the "force" and the target value of the "position" which are included in this operational command with the issued time, and may generate time series data similar to the operational data.

Note that the correctional information detecting part 35 may detect the operation operational command as the correctional information. For example, when the executing operational command is corrected, the correctional information detecting part 35 may detect the manipulation operational information used for this correction as the correctional information, and when the executing operational command is not corrected, the correctional information detecting part 35 may generate the detection result without the correctional information.

The first memory part 38 stores the operational information indicative of the operation of the mechanical apparatus 10. In detail, the first memory part 38 stores the operational information on the mechanical apparatus 10 which is received from the operational information detecting device 50. The first memory part 38 stores the operational information and time at which this operational information is detected by the operational information detecting device 50 so as to associate them with each other.

The second memory part 39 stores the correctional information indicative of the correction made by the correction commanding part 33. In detail, the second memory part 39 stores the correctional information received from the correctional information detecting part 35. The second memory part 39 stores the correctional information and an issued time of the operational command corresponding to this correctional information so as to associate them with each other.

The learning part 36 is a learning model which carries out machine learning so that it improves the accuracy of the output data to the input data by carrying out the learning using the learning data. Such a learning model includes a neural network such as Deep Learning, Random Forest, Genetic Programming, a regression model, a tree model, a Bayesian model, a time series model, a clustering model, and an ensemble learning model. In this embodiment, the learning model is the neural network.

The learning part 36 carries out the machine learning using the operational information on the mechanical apparatus 10 and the correctional information corresponding to this operational information. Further, the learning part 36 after the machine learning uses the operational information on the mechanical apparatus 10 as the input data, and uses the command corresponding to this operational information as the output data. In this embodiment, the output data is the executing operation correction command. For example, in the machine learning, the operational information on the mechanical apparatus 10 may be used as the input data, and the correctional information performed when it is in the state of this operational information may be used as teacher data. At this time, the weighting of a connection between the nodes in the neural network (described later) is adjusted so that the output data to the input data become in agreement with the teacher data. The learning part 36 after such an adjustment of the weighting can output the executing operation correction command to be performed when it is in the state of this operational information, when the operational information on the mechanical apparatus 10 is inputted.

Figure 2:
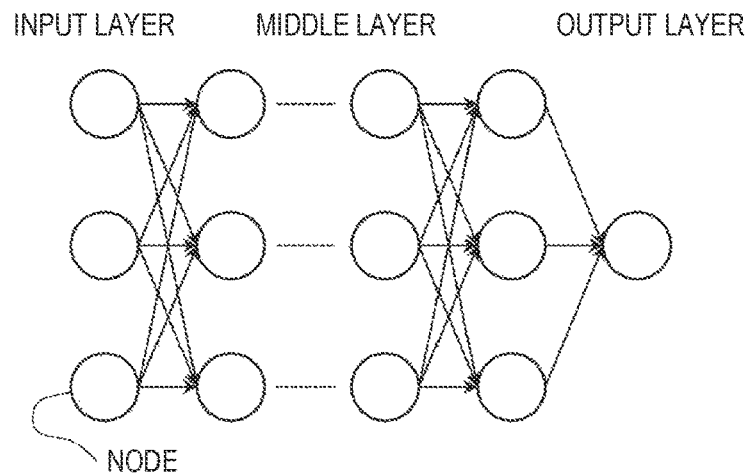
FIG. 2 is a view illustrating one example of a model of a neural network.

The neural network is an information processing model which uses a cranial nerve system as a model. The neural network includes a plurality of node layers including an input layer and an output layer. The node layer includes one or more nodes. For example, the learning part 36 may include a neural network as illustrated in FIG. 2. FIG. 2 is a view illustrating one example of the model of the neural network. As illustrated in FIG. 2, when the neural network includes an input layer, a middle layer, and an output layer, the neural network sequentially performs for information inputted into the node of the input layer, an output process from the input layer to the middle layer and an output process from the middle layer to the output layer to output an output result which suits the input information. Note that each node of one layer is connected to each node of the following layer, and the connection between the nodes is weighted. The information on a node of one layer is weighed according to the connection between nodes, and it is outputted to a node of the following layer.

Figure 3:
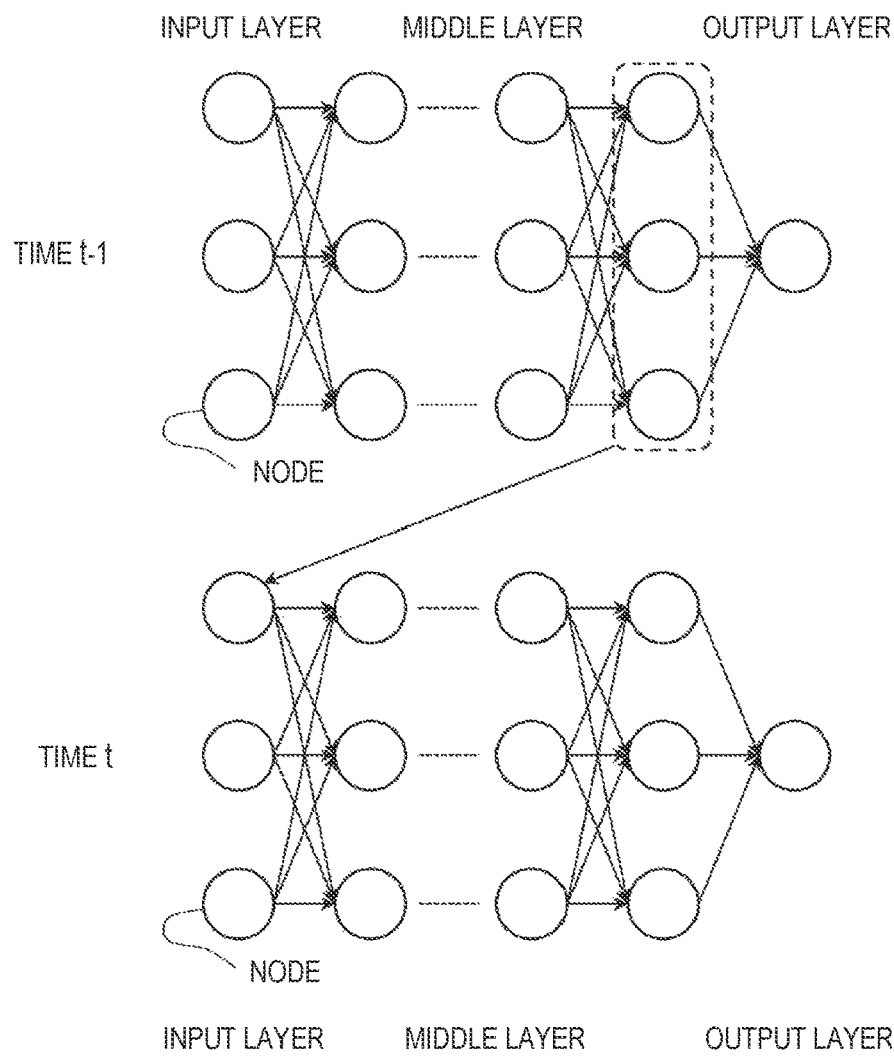
FIG. 3 is a view illustrating another example of the model of the neural network.

The learning part 36 may include a recurrent neural network as illustrated in FIG. 3. FIG. 3 is a view illustrating another example of the model of the neural network. As illustrated in FIG. 3, the recurrent neural network treats time series information. The input data of the recurrent neural network includes data at the present time t, and the output data of the middle layer in the recurrent neural network at a time t−1 before a time t. Thus, the recurrent neural network has a network structure in consideration of the time series information. Since such a recurrent neural network outputs in consideration of the temporal behavior of the operational information, it can improve the accuracy of the output data.

Figure 4:
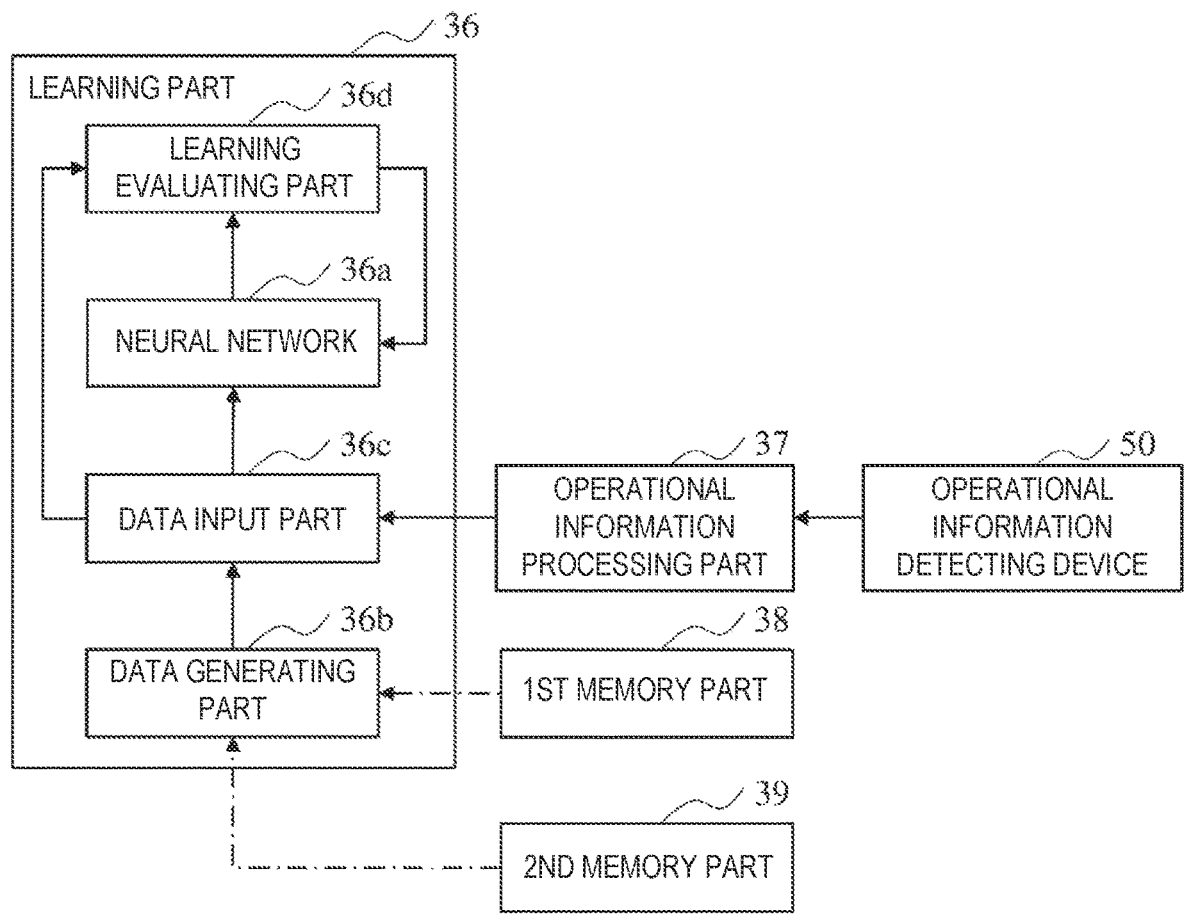
FIG. 4 is a functional block diagram illustrating one example of a configuration of a learning part according to this embodiment.

One example of a configuration of the learning part 36 is described. FIG. 4 is a functional block diagram illustrating one example of the configuration of the learning part 36 according to this embodiment. As illustrated in FIG. 4, the learning part 36 includes a neural network 36a, a data generating part 36b, a data input part 36c, and a learning evaluating part 36d. The configuration of the neural network 36a is the configuration as described above. The neural network 36a is preferably a recurrent neural network, because the time series data is treated as follows.

In this example, while the mechanical apparatus 10 performs the given operation once, each command and each data are acquired at a given sampling interval. For example, the correctional information detecting part 35 acquires time series data $Pm_0$, $Pm_1$, $Pm_2$, . . . , and $Pm_u$ (hereinafter, abbreviated as $Pm_0$-$Pm_u$) on a corrected operational command Pm as the correctional information, at this sampling interval. The operational information detecting device 50 acquires time series data $Pd_0$, $Pd_1$, $Pd_2$, . . . , and $Pd_u$ (hereinafter, abbreviated as $Pd_0$-$Pd_u$) of the operational data Pd of the mechanical apparatus 10 at this sampling interval. Below, the numeral of the subscript in each time series data indicates the order of sampling time (intermittent time). Therefore, the time series data with the same numeral of the subscript is meant to be data acquired at the same or substantially the same sampling time. For example, the time series data of the operational data Pd which is performed by the mechanical apparatus 10 according to the time series data $Pm_t$ of the corrected operational command Pm are time series data $Pd_i$. The time series data with the same numeral of such a subscript are time series data which correspond mutually.

First, processing of each component of the learning part 36 during the machine learning is described. The data generating part 36b generates time series data $pd_0$-$pd_u$ of the learning data pd based on the time series data $Pd_0$-$Pd_u$ of the operational data Pd stored in the first memory part 38. Further, the data generating part 36b generates time series data $pn_0$-$pn_u$ of teacher data pn based on the time series data $Pm_0$-$Pm_u$ of the corrected operational command Pm stored in the second memory part 39. The data generating part 36b outputs the generated time series data to the data input part 36c.

The data input part 36c sequentially inputs the time series data $pd_0$-$pd_u$ of the learning data pd into each neuron of the input layer of the neural network 36a. For example, when the data input part 36c inputs the time series data $pd_i$ (i=0 to u) of the learning data pd at a certain sampling time $t_i$, the neural network 36a estimates and outputs executing operation correction command $Pn_{i+1}$ at the next sampling time $t_{i+1}$ by a forward calculation.

Based on the executing operation correction command $Pn_{i+1}$, the learning evaluating part 36d extracts the time series data $pn_{i+1}$ at the sampling time $t_{i+1}$ by searching for the time series data $pn_0$-$pn_u$ of the teacher data pn. Further, the learning evaluating part 36d adjusts the weight between the neurons of the neural network 36a by a backward calculation so that the executing operation correction command $Pn_{i+1}$ become in agreement with the time series data $pn_{i+1}$, or an error between these is minimized. Further, the data input part 36c and the learning evaluating part 36d optimize the weight between the neurons by performing the above processing for all the time series data $pd_0$-$pd_u$ of the learning data pd.

Next, processing of each component of the learning part 36 during input/output of the data is described. During the operation of the mechanical apparatus 10, the operational information detecting device 50 detects the operational data $Pd_i$ at the present sampling time $t_i$, and outputs it to the learning part 36 via the operational information processing part 37. The data input part 36c inputs the operational data $Pd_i$ into the neural network 36a. The neural network 36a outputs to the operational commanding part 32 the executing operation correction command $Pn_{i+1}$ at the next sampling time $t_{i+1}$ as the output data by using the operational data $Pd_i$ as the input data. The operational commanding part 32 generates the executing operational command to which the executing operation correction command $Pn_{i+1}$ is reflected. Thus, at each sampling time $t_i$ (i=0 to u−1), the neural network 36a outputs the executing operation correction command $Pn_{i+1}$ at the sampling time $t_{i+1}$, while using the operational data $Pd_i$ at the sampling time $t_i$ as the input data, to output the executing operational command to which this executing operation correction command $Pn_{i+1}$ is reflected.

Note that the neural network 36a may be configured so that, as the input data, the operational data $Pd_i$ at the sampling time $t_i$ and the operational data $Pd_{i-1}$ to $Pd_{i-n}$ at the sampling time $t_{i-1}$ to $t_{i-n}$ (n is a given natural number) before the sampling time $t_i$ are inputted. In this case, during the machine learning, the data input part 36c inputs the time series data $Pd_i$ and $Pd_{i-1}$ to $Pd_{i-n}$ into the neural network 36a for the learning data pd at the sampling time $t_i$, and the neural network 36a outputs the executing operation correction command $Pn_{i+1}$ at the next sampling time $t_{i+1}$. The learning evaluating part 36d adjusts the weight between the neurons of the neural network 36a for the executing operation correction command $Pn_{i+1}$ and the time series data $pn_{i+1}$ of the teacher data pn.

Moreover, during the input/output of the data, the neural network 36a outputs the executing operation correction command $Pn_{i+1}$ at the sampling time $t_{i+1}$ by using the operational data $Pd_i$ and $Pd_{i-1}$ to $Pd_{i-n}$ at the sampling time $t_i$ and $t_{i-1}$ to $t_{i-n}$ to as the input data for the sampling time $t_i$. Such a neural network 36a can improve the learning efficiency and the learning accuracy. Since such a neural network 36a estimates the next motion of the acting part 11 etc. of the mechanical apparatus 10 not only based on the operational data at the present moment but also based on a series of operational data before the moment, it enables the accurate estimation.

Note that the neural networks 36a as described above may be built for every kind of complex operation which can be performed by the mechanical apparatus 10, or may be configured so that one neural network 36a corresponds to one kind of complex operation, or may be configured so that one neural network 36a corresponds to two or more kinds of complex operations.

1-2. Operation

Figure 5:
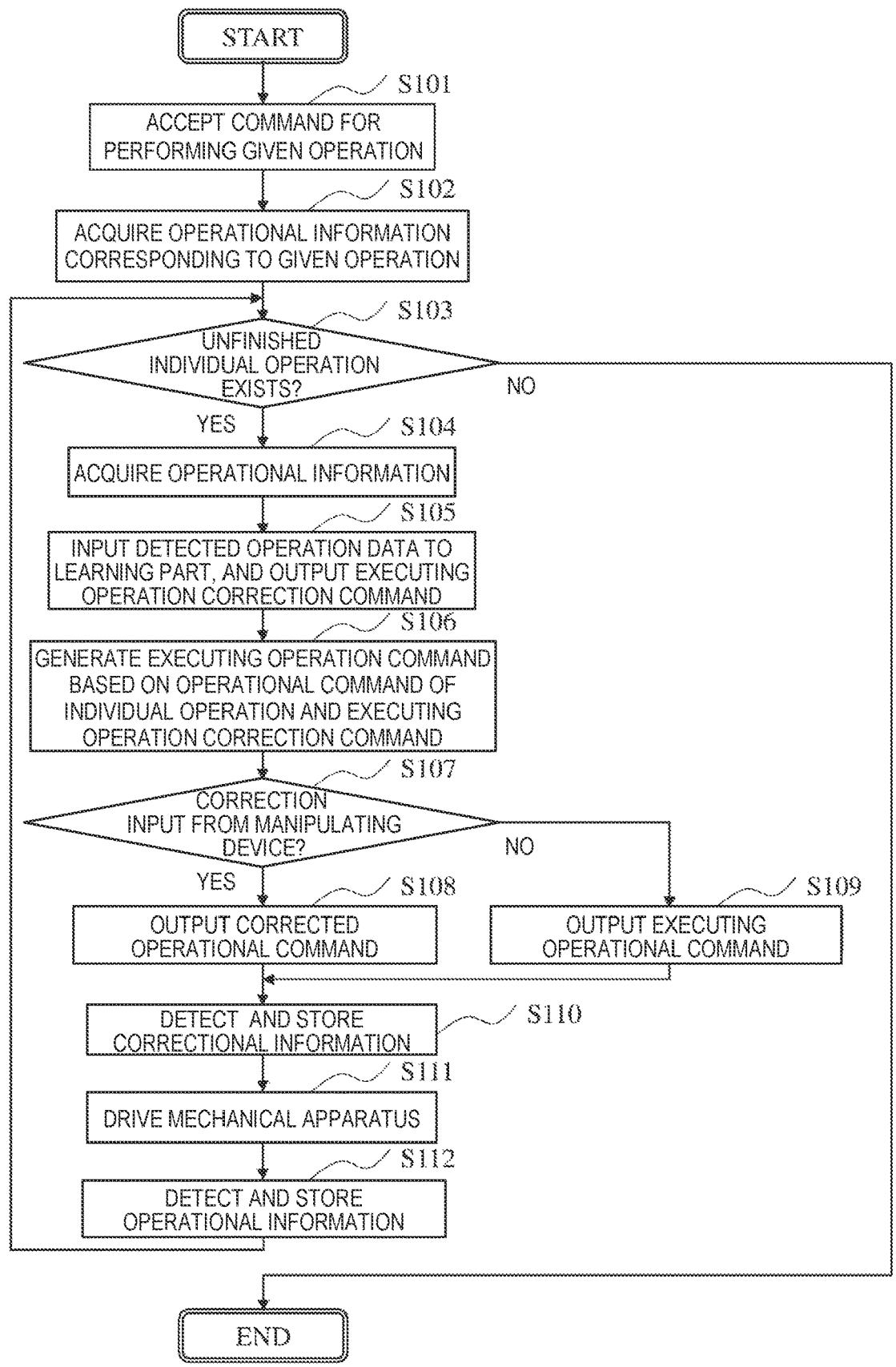
FIG. 5 is a flowchart illustrating one example of operation of a mechanical apparatus system according to this embodiment.

The operation of the mechanical apparatus system 1 according to this embodiment is described. In detail, one example of operation in the automatic operating mode is described. FIG. 5 is a flowchart illustrating one example of operation of the mechanical apparatus system 1 according to this embodiment. Further, FIG. 5 illustrates one example in which the mechanical apparatus system 1 makes the mechanical apparatus 10 perform a given operation for one cycle. In this example, the mechanical apparatus system 1 is described as making the mechanical apparatus 10 perform the entire given operations automatically.

As illustrated in FIG. 5, first, the operator inputs into the mechanical apparatus system 1 a command for performing the given operation in the automatic operating mode, and the control device 30 accepts this command (Step S101). In this case, the operator may input via the manipulating device 20, or may input via other input devices provided to the mechanical apparatus system 1. Suppose that the given operation is complex operation in this example.

Next, the operation determining part 31 of the control device 30 acquires the operational information corresponding to the given operation (Step S102). The operation determining part 31 extracts the operational information corresponding to each individual operation included in the given operation from the third memory part 40, and sequentially outputs it to the operational commanding part 32. Further, the operation determining part 31 outputs the contents of the given operation to the learning part 36.

Next, the operational commanding part 32 determines whether there is any unfinished operational information among the operational information corresponding to the individual operation included in the given operation (that is, it determines whether there is any unfinished individual operation (Step S103). If there is any unfinished operational information (Yes at Step S103), the operational commanding part 32 transits to Step S104, and if there is no unfinished operational information (No at Step S103), it ends the series of processings.

At Step S104, the learning part 36 acquires the operational information on the acting part 11 etc. of the mechanical apparatus 10 (in detail, the operational data $Pd_i$ included in the operational information). The operational data $Pd_i$ is the operational data at the time $t_i$, and its initial value at time $t_0$ which is a start time of the processing is $Pd_0$. At this time, the learning part 36 may request the operational information processing part 37 of the control device 30 for the operational information. The operational information processing part 37 may request the operational information detecting device 50 for the detection of the operational information, and may acquire the detection result of the operational information detecting device 50. Alternatively, the learning part 36 may receive the operational information from the operational information processing part 37 at Step S112 (described later), and acquire the operational data from this operational information, or may acquire the operational information stored in the first memory part 38 of the control device 30 at Step S112.

Next, the learning part 36 causes the neural network 36a corresponding to the given operation to generate the executing operation correction command $Pm_{i+1}$ by inputting the operational data $Pd_i$ into the neural network 36a, and outputs the executing operation correction command $Pm_{i+1}$ to the operational commanding part 32 (Step S105).

Next, the operational commanding part 32 uses the operational information corresponding to the given operation to generate the executing operational command for causing the mechanical apparatus 10 to perform this operation, and outputs it to the correction commanding part 33 (Step S106). In detail, for the individual operation to be first performed among the unfinished individual operations included in the given operation, the operational commanding part 32 generates a determination operational command $Ps_{i+1}$ that is an operational command for performing the operational information corresponding to this individual operation. Further, the operational commanding part 32 generates an executing operational command $Pe_{i+1}$ based on the determination operational command $Ps_{i+1}$ and the executing operation correction command $Pm_{i+1}$. The determination operational command $Ps_{i+1}$ and the executing operation correction command $Pm_{i+1}$ are commands corresponding to the time $t_{i+1}$.

Next, the correction commanding part 33 determines whether there is any correction input from the manipulating device 20, that is an input for correcting the operation of the mechanical apparatus 10 (Step S107). If there is any correction input (Yes at Step S107), the correction commanding part 33 transits to Step S108, and if there is no correction input (No at Step S107), it transits to Step S109.

At Step S108, the correction commanding part 33 corrects the executing operational command $Pe_{i+1}$ of the operational commanding part 32 according to the manipulational information outputted from the manipulating device 20, and outputs it to the drive commanding part 34. The correction commanding part 33 generates a corrected operational command $Pf_{i+1}$ by adding an operation operational command $Po_{i+1}$ for causing the acting part 11 to perform the operation corresponding to the operational information and the executing operational command $Pe_{i+1}$ of the operational commanding part 32.

At Step S109, the correction commanding part 33 outputs the executing operational command $Pe_{i+1}$ of the operational commanding part 32 to the drive commanding part 34.

Next, at Step S110, the correctional information detecting part 35 detects the correctional information, and stores it in the second memory part 39. If there is any correction of the executing operational command $Pe_{i+1}$, the correctional information detecting part 35 detects the corrected operational command $Pf_{i+1}$ as the correctional information. If there is no correction of the executing operational command $Pe_i$, the correctional information detecting part 35 detects the uncorrected executing operational command $Pe_{i+1}$ as correctional information.

Next, the drive commanding part 34 generates the drive data that is a command for causing each drive of the mechanical apparatus 10 to drive so that the acting part 11 carries out the operation corresponding to the corrected operational command $Pf_{i+1}$ or the executing operational command $Pe_{i+1}$, and outputs it to each drive. That is, the drive commanding part 34 drives the mechanical apparatus 10 so that the mechanical apparatus 10 performs the operation corresponding to the command described above (Step S111).

Next, the operational information detecting device 50 detects the operational data $Pd_{i+1}$ as the operational information on the mechanical apparatus 10 which operates, and stores it in the first memory part 38 (Step S112). The operational information detecting device 50 outputs the detected operational information which is the detected operational data $Pd_{i+1}$ to the first memory part 38 and the operational information processing part 37. The operational information processing part 37 outputs the detected operational information to the learning part 36, the manipulating device 20, and the output device 60. Further, the operational information processing part 37 returns to the processing at Step S103.

The manipulating device 20 gives the operator the tactile sense corresponding to the force data and the position data of the operational data which are included in the detected operational information. The tactile sense can indicate the operating state of the acting part 11. For example, when the manipulating device 20 gives to the hand of the operator who grips the manipulating device 20 the tactile sense of the feel which the operator pushes by himself/herself, the operator can feel the state where the acting part 11 pushes the object. When the manipulating device 20 gives the operator the tactile sense of the feel which he/she pulls by himself/herself, the operator can feel the state where the acting part 11 pulls or lifts the object. When the manipulating device 20 gives the tactile sense of the surface texture, the operator can feel the roughness state of the surface of the object where the acting part 11 contacts. When the manipulating device 20 gives the tactile sense of the pressure, the operator can feel the hardness state of the surface of the object where the acting part 11 contacts.

The output device 60 presents the operator visually and/or aurally the position and the posture of the acting part 11 with respect to the object based on the position data etc. of the operational data included in the detected operational information.

Although at Steps S103-S112 described above the processing related to the operation to be performed at the sampling time $t_{i+1}$ is performed, processing related to operation to be performed at the next sampling time $t_{i+2}$ is performed at the following Steps S103-S112.

After the given operation is finished, the control device 30 may update the operational information corresponding to each of the individual operations included in the given operation stored in the third memory part 40, by using the operational information detected at the sampling time $t_0$-$t_u$.

Although in the above the control device 30 generates the executing operational command by correcting the determined operational command using the executing operation correction command of the learning part 36, at each timing of the sampling time $t_0$-$t_u$, it is not limited to this configuration. The control device 30 may generate the executing operational command as described above at timing when the individual operation included in the given operation is changed.

Further, the control device 30 may perform the machine learning of the learning part 36 at any moment. For example, the control device 30 may cause the learning part 36 to carry out the machine learning using the data accumulated within one given work, each time one given work by the mechanical apparatus 10 is finished. Alternatively, each time the given number of given works by the mechanical apparatus 10 are finished, the control device 30 may cause the learning part 36 to carry out the machine learning using the data accumulated for the given number of given works. Alternatively, for every given period, such as given number of days, given number of weeks, and given number of months, the control device 30 may cause the learning part 36 to carry out the machine learning using the data accumulated in the given work within this given period.

1-3. Effects Etc

As described above, in the mechanical apparatus system 1 according to this embodiment, the control device 30 of the mechanical apparatus 10 includes the operational commanding part 32 and the drive commanding part 34 as the motion controller which controls the operation of the mechanical apparatus 10 according to the operational command for operating the mechanical apparatus 10, the correction commanding part 33 and the drive commanding part 34 as the correction controller which corrects the operation of the mechanical apparatus 10 according to the manipulational information outputted from the manipulating device 20 for manipulating the mechanical apparatus 10, the first memory part 38 which stores first operational information indicative of the operation of the mechanical apparatus 10, the second memory part 39 which stores the correctional information indicative of the correction made by the correction commanding part 33, and the learning part 36 which carries out the machine learning using the first operational information and the correctional information corresponding to the first operational information, and uses the first operational information as the input data and the command corresponding to this first operational information as the output data. The operational commanding part 32 controls the operation of the mechanical apparatus 10 according to the operational command based on the command of the learning part 36. The manipulating device 20 outputs the manipulational information based on second operational information indicative of the motion of the manipulating device 20.

According to the above configuration, the learning part 36 carries out the machine learning using, as the learning data, the first operational information indicative of the operation of the mechanical apparatus 10 and the correctional information indicative of the correction of the operation of the mechanical apparatus 10 performed using the manipulating device 20. Further, the learning part 36 uses the first operational information as the input data and outputs the command corresponding to this first operational information, and this command is reflected to the control of the operation of the mechanical apparatus 10. Since the learning data described above is generated by the operator correcting the operation of the mechanical apparatus 10 via the manipulating device 20, the generation is simple. Further, since the correction of the operation of the mechanical apparatus 10 is made by the operator who confirmed the operation of the mechanical apparatus 10, it is appropriate. Therefore, the simple generation of the suitable learning data is possible.

The learning part 36 which carries out the machine learning using such learning data can achieve within a short period of time the output accuracy for outputting the command corresponding to the operation of the mechanical apparatus 10, which the operator etc. believes that it is ideal. Therefore, a shortening of the time required for the machine learning is possible.

In the mechanical apparatus system 1 according to this embodiment, the manipulating device 20 may include the inertial measurement unit, and output the manipulational information based on the measurement data of the inertial measurement unit as the second operational information. According to the above configuration, the manipulating device 20 outputs the manipulational information based on the second operational information indicative of the motion of the manipulating device 20. Since the manipulational information is the information based on the measurement data of the inertial measurement unit, it can exactly indicate the motion of the manipulating device 20. Therefore, the accuracy of the manipulational information improves and, thereby, the correction through the manipulating device 20 is reflected to the operation of the mechanical apparatus 10 with high accuracy.

In the mechanical apparatus system 1 according to this embodiment, the manipulating device 20 may be configured to be freely movable in arbitrary directions in the three-dimensional space. According to the above configuration, the manipulating device 20 can make various corrections to the operation of the mechanical apparatus 10.

Further, in the mechanical apparatus system 1 according to this embodiment, the first operational information indicative of the operation of the mechanical apparatus 10 may include the force data indicative of the force which the mechanical apparatus 10 applies to the object. According to the above configuration, the learning part 36 performs the machine learning in consideration of the force which the mechanical apparatus 10 applies to the object. Moreover, the learning part 36 outputs the command to which the force which the mechanical apparatus 10 applies to the object is reflected. Therefore, the control device 30 can appropriately perform force control of the acting part 11 etc. of the mechanical apparatus 10 by using the learning part 36.

Further, in the mechanical apparatus system 1 according to this embodiment, the first operational information indicative of the operation of the mechanical apparatus 10 may include the position data indicative of the position of the mechanical apparatus 10. According to the above configuration, the learning part 36 performs the machine learning in consideration of the position of the mechanical apparatus 10, such as the position of the acting part 11. Then, the learning part 36 outputs the command to which the position of the mechanical apparatus 10 is reflected. Therefore, the control device 30 can appropriately perform position control of the acting part 11 etc. of the mechanical apparatus 10 by using the learning part 36.

In the mechanical apparatus system 1 according to this embodiment, the control device 30 may include the operational information processing part 37 as the processing part which outputs to the manipulating device 20 the first operational information indicative of the operation of the mechanical apparatus 10, and the manipulating device 20 may include the haptics device which gives the operator the feedback of the operating state based on the first operational information as the tactile sense. According to the above configuration, the operator can operate the manipulating device 20, while feeling the operation of the mechanical apparatus 10. Therefore, the operator can appropriately correct the operation of the mechanical apparatus 10 using the manipulating device 20.

In the mechanical apparatus system 1 according to this embodiment, the learning part 36 may include the neural network. According to the above configuration, the neural network enables flexible and highly-precise processing. Therefore, the learning part 36 can output the highly-precise output data for various input data.

Further, in the mechanical apparatus system 1 according to this embodiment, the first operational information indicative of the operation of the mechanical apparatus 10 may include the present operation and the past operation of the mechanical apparatus 10. According to the above configuration, the first operational information indicates the time series information on the operation of the mechanical apparatus 10. Then, the learning part 36 carries out the machine learning using such time series information, and it uses such time series information as the input data. Therefore, the learning part 36 performs the machine learning in consideration of the temporal behavior of the mechanical apparatus 10, and outputs the command to which the temporal behavior of the mechanical apparatus 10 is reflected. Therefore, the output accuracy of the learning part 36 improves.

The control system 100 according to this embodiment includes the control device 30 according to this embodiment, and the manipulating device 20. According to the above configuration, similar effects to the control device 30 according to this embodiment are obtained.

The mechanical apparatus system 1 according to this embodiment includes the control device 30 according to this embodiment, the mechanical apparatus 10, and the manipulating device 20. According to the above configuration, similar effects to the control device 30 according to this embodiment are obtained.

Modification

A mechanical apparatus system 1A according to a modification of this embodiment is described. In this modification, the mechanical apparatus system 1A is provided with a robot 10A as the mechanical apparatus, and controls the operation of the robot 10A by using an image of an object to be processed by the robot 10A in addition to the operational data. Below, regarding this modification, differences from the above embodiment is mainly described, and description of similarities to the above embodiment is suitably omitted.

2-1. Mechanical Apparatus System

Figure 6:
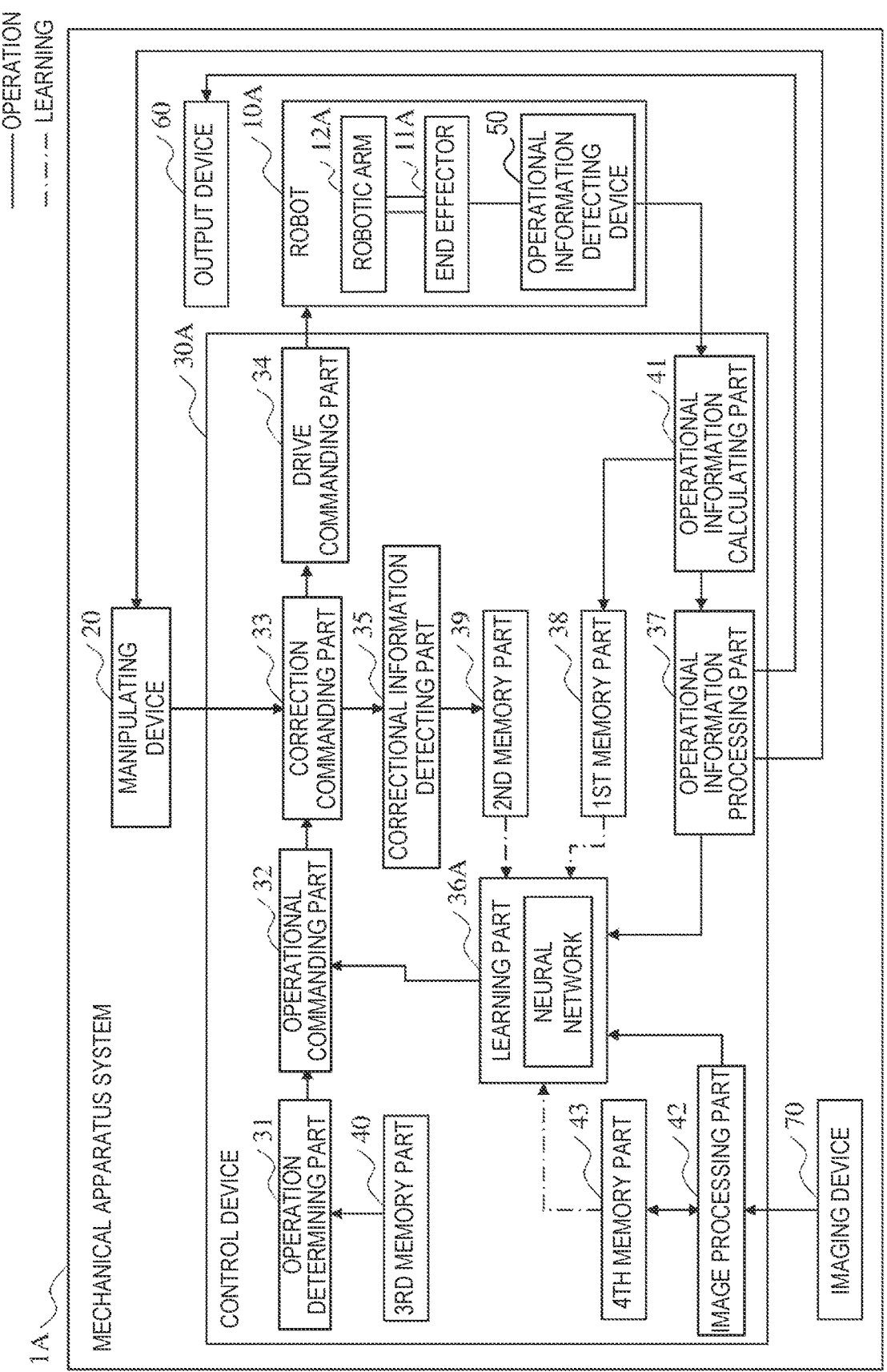
FIG. 6 is a functional block diagram illustrating one example of a configuration of a mechanical apparatus system according to a modification.

FIG. 6 is a functional block diagram illustrating one example of a configuration of the mechanical apparatus system 1A according to this modification. As illustrated in FIG. 6, the mechanical apparatus system 1A according to this modification is further provided with an imaging device 70, as compared with the mechanical apparatus system 1 according to the above embodiment. Further, the mechanical apparatus system 1A includes the robot 10A as the mechanical apparatus 10, and a control device 30A as the control device 30. The robot 10A is provided with an end effector 11A and a robotic arm 12A, the end effector 11A corresponds to the acting part 11, and the robotic arm 12A corresponds to the operating part 12. The details of the robot 10A will be described later.

The imaging device 70 images the object to be processed by the robot 10A. Examples of the imaging device 70 are a digital camera, a digital camcorder, etc. For example, although the imaging device 70 is disposed at the end effector 11A or the robotic arm 12A, it may be disposed at a position distant from the end effector 11A or the robotic arm 12A. The imaging device 70 outputs a signal of the captured image to the control device 30A. The imaging device 70 may output the image signal to the output device 60. Therefore, the operator can confirm the processing state of the object by the end effector 11A via the output device 60. Then, the operator can perform the correction of the operation of the end effector 11A by using the manipulating device 20 and the operation of the robot 10A in the manual operating mode, while confirming the processing state of the object.

2-2. Robot

Figure 7:
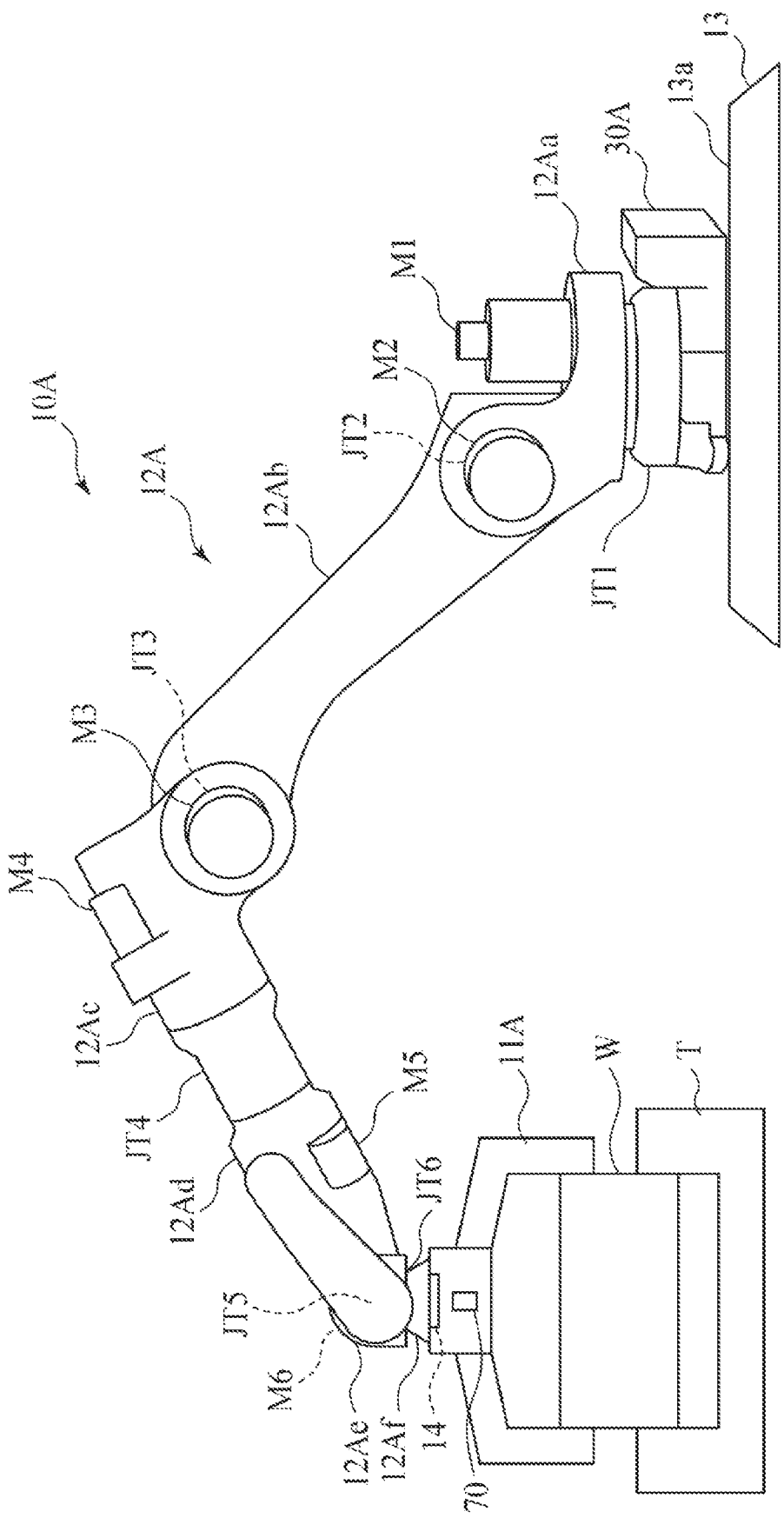
FIG. 7 is a side view illustrating one example of a configuration of a robot according to this modification.

FIG. 7 is a side view illustrating one example of a configuration of the robot 10A according to this modification. As illustrated in FIG. 7, a base part of the robotic arm 12A of the robot 10A is attached and fixed to a pedestal 13, and the end effector 11A is detachably attached to a tip-end part of the robotic arm 12A. The end effector 11A is configured to apply to the object various operations corresponding to the object, such as gripping, sucking, lifting, or scooping. In the example of FIG. 7, the end effector 11A is configured to grip an object W, and the robot 10A performs a work for assembling the object W gripped by the end effector 11A to an assembling object T. The work of the robot 10A is not limited to the assembly, but may be any kind of works. Examples of the work of the robot 10A are classification, assembly, painting, welding, joining, chipping, polishing, sealing, a semiconductor production, a medicine preparation, and a medical practice such as a surgery.

The robotic arm 12A includes links 12Aa-12Af serially disposed from a base end thereof toward a tip end, joints JT1-JT6 sequentially connecting the links 12Aa-12Af, and arm drives M1-M6 which rotate the joints JT1-JT6, respectively. The operation of the arm drives M1-M6 is controlled by the control device 30A. Although not limited to this configuration, in this embodiment, each of the arm drives M1-M6 uses electric power as a power source, and has a servomotor as an electric motor which drives the corresponding arm drive. Note that the number of joints of the robotic arm 12A is not limited to six, but may be seven or more, or may be one or more and five or less.

The link 12Aa is attached to an attaching surface 13a of the pedestal 13, and the end effector 11A is attached to a tip-end part of the link 12Af. A mechanical interface is provided to the tip-end part of the link 12Af. The end effector 11A is attached to the mechanical interface via a force sensor 14. One example of the force sensor 14 is an inner force sensor, and the configuration of the force sensor is not limited in particular, it may include a 3-axis acceleration sensor, for example. The force sensor 14 detects a force which the end effector 11A applies to the object as a reaction force which receives from this object. The force detected by the force sensor 14 is converted into force data by a suitable signal processor (not illustrated). This signal processor is provided to the force sensor 14 or the control device 30A, for example. In this specification, for convenience, it is expressed that the force sensor 14 detects the force data.

The joint JT1 couples the pedestal 13 to a base-end part of the link 12Aa pivotably on a vertical axis which is perpendicular to the attaching surface 13a. The joint JT2 couples a tip-end part of the link 12Aa to a base-end part of the link 12Ab pivotably on a horizontal axis which is parallel to the attaching surface 13a. The joint JT3 couples a tip-end part of the link 12Ab to a base-end part of the link 12Ac pivotably on an axis in a direction parallel to the attaching surface 13a. The joint JT4 couples a tip-end part of the link 12Ac to a base-end part of the link 12Ad pivotably on a longitudinal axis of the link 12Ac. The joint JT5 couples a tip-end part of the link 12Ad and a base-end part of the link 12Ae pivotably on an axis in a direction perpendicular to the longitudinal direction of the link 12Ad. The joint JT6 couples a tip-end part of the link 12Ae to a base-end part of the link 12Af twistably to the link 12Ae.

Each of the arm drives M1-M6 may include a servomotor (not illustrated), a rotation sensor (not illustrated), such as an encoder, which detects an amount of rotation of a rotator of the servomotor, and a current sensor (not illustrated) which detects driving current of the servomotor. Each of the arm drives M1-M6 operates the servomotor according to the command etc. outputted from the control device 30A, and output the detection values of the rotation sensor and the current sensor to the control device 30A. The control device 30A detects, based on the detection values of the rotation sensor and the current sensor fed back from each servomotor, the amount of rotation, rotational speed, current value, etc. of the rotator of this servomotor, and controls a rotation start, a rotation stop, rotational speed, and rotational torque of this servomotor using the detection result. Therefore, the control device 30A can stop each servomotor at arbitrary rotational positions, can rotate the servo motor at arbitrary rotational speeds, and can operate the servomotor at arbitrary rotational torques. Therefore, the control device 30A can operate the robotic arm 12A variously and precisely.

An operational information calculating part 41 (described later) of the control device 30A calculates a three-dimensional position and a three-dimensional posture of the end effector 11A as the position data, by integrating the amounts of rotation of all the servomotors of the arm drives M1-M6. Further, the data which the force sensor 14 detects is the force data. The position data and the force data which are described above are the operational data of the robot 10A. The rotation sensor and the force sensor 14 of the arm drives M1-M6 constitute the operational information detecting device 50. Further, the detection signals of the current sensors of the arm drives M1-M6 are used in order for the control device 30A to carry out a feedback control so that the current of the servomotor of each of the arm drives M1-M6 becomes a current value according to a current command. As described above, although the robot 10A is constituted as a vertical articulated robot, it is not limited to this configuration.

2-3. Manipulating Device

Figure 8:
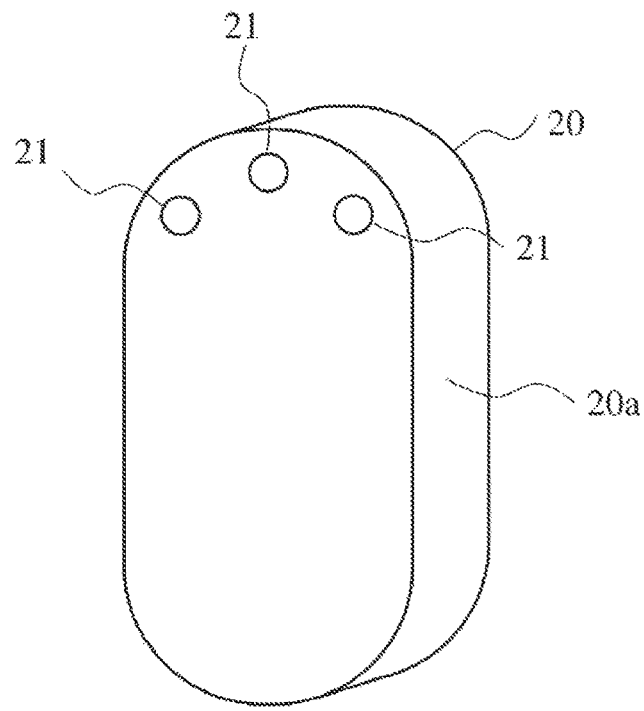
FIG. 8 is a view illustrating one example of the appearance of a manipulating device according to this modification.
Figure 9:
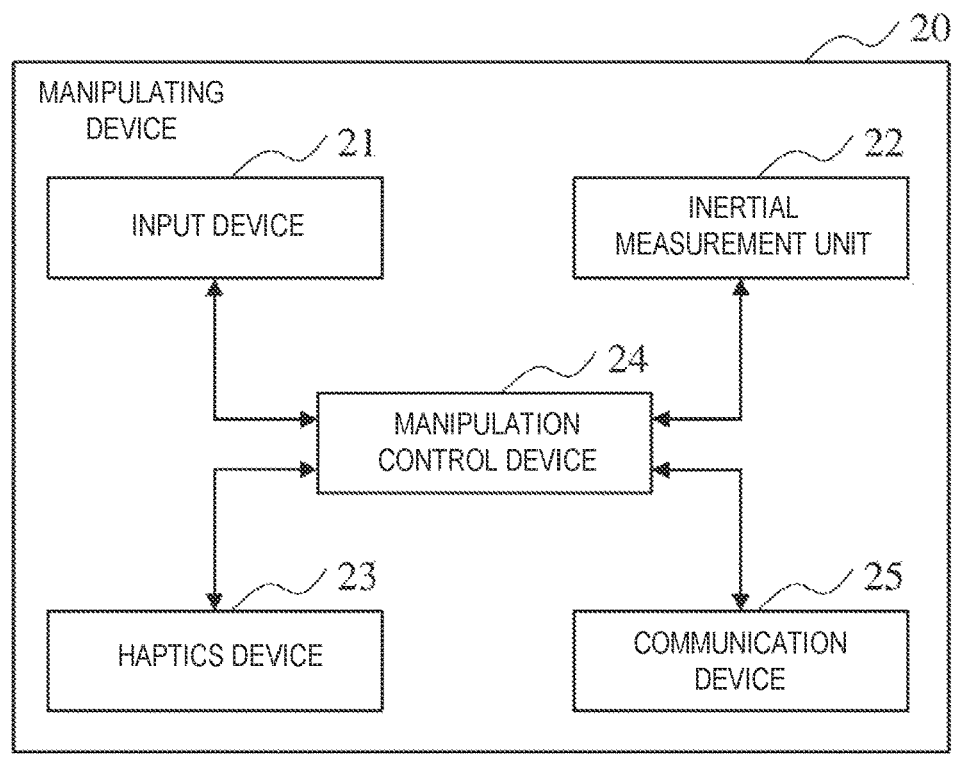
FIG. 9 is a functional block diagram illustrating one example of a configuration of the manipulating device according to this modification.

FIG. 8 is a view illustrating one example of the appearance of the manipulating device 20 according to this modification. FIG. 9 is a functional block diagram illustrating one example of a configuration of the manipulating device 20 according to this modification. As illustrated in FIG. 8, the manipulating device 20 is provided with a casing 20a which is grippable by a human hand. Further, in the manipulating device 20, an input device 21 is provided to the casing 20a. In FIG. 8, although the input device 21 is a button switch, it is not limited to this configuration. The manipulating device 20 includes, inside the casing 20a, an inertial measurement unit 22, a haptics device 23, a manipulation control device 24, and a communication device 25, which are not illustrated. In the mechanical apparatus system 1A, the control device 30A performs a bilateral control to the robot 10A using the manipulating device 20.

Components of the manipulating device 20 are described with reference to FIG. 9. The haptics device 23 is as described in the above embodiment.

The communication device 25 connects the manipulating device 20 to the control device 30A wiredly or wirelessly. The communication device 25 may include a communication circuit. The wired and wireless communications may be any kind of communications.

The input device 21 accepts an input of a command and information etc. by the operator, and transmits the inputted command and information etc. to the control device 30A via the manipulation control device 24 and the communication device 25. Such an input device 21 may accept a physical input, a sound input, an image input, etc. For example, the input device 21 may be provided with a device, such as a slide switch, a button switch, a key, a lever, a touch panel, a microphone, and a camera. For example, the command and information inputted into the input device 21 may indicate a selection and an execution command of the operating mode of the robot 10A, a selection and an execution command of the operation of the end effector 11A, etc.

The inertial measurement unit 22 includes a 3-axis acceleration sensor and a 3-axis angular velocity sensor, and detects an acceleration and an angular velocity in the three axial directions of the manipulating device 20. The measurement data of the acceleration and the angular velocity in the three axial directions detected by the inertial measurement unit 22 is converted by the manipulation control device 24 into various information indicative of the motion and the acting force of the manipulating device 20, such as the position, posture, movement, moving speed, acceleration, and force, and this information is transmitted to the control device 30A via the communication device 25 as the manipulational information on the manipulating device 20. Note that the measurement data of the acceleration and the angular velocity in the three axial directions may be transmitted to the control device 30A, and it may perform operation from which the control device 30A converts the data concerned. The information converted from the measurement data of the inertial measurement unit 22 may indicate the position, posture, movement, moving speed, acceleration, acting force, etc. of the end effector 11A. The inertial measurement unit 22 may include a magnetic field sensor, a temperature sensor, etc. For example, the measurement data of the acceleration and the angular velocity in the three axial directions may be corrected using the measurement data of the magnetic field sensor and the temperature sensor.

The manipulation control device 24 controls the entire operation of the manipulating device 20. The manipulation control device 24 may have similar configuration to the configuration illustrated in the embodiment regarding the control device 30. For example, the operation control device 24 receives the signal from the input device 21, converts it into information indicative of manipulation corresponding to this signal, and transmits it to the control device 30A. The manipulation control device 24 converts the measurement data of the inertial measurement unit 22, and transmits the converted data to the control device 30A. Alternatively, the manipulation control device 24 transmits the measurement data of the inertial measurement unit 22 to the control device 30A. The manipulation control device 24 receives the operational information on the robot 10A from the control device 30A, converts the operational data etc. included in the operational information into data which suits the input into the haptics device 23, and outputs it to the haptics device 23.

2-4. Control Device

The configuration of the control device 30A is described. As illustrated in FIG. 6, the control device 30A according to this modification further includes the operational information calculating part 41, an image processing part 42, and a fourth memory part 43, and includes a learning part 36A instead of the learning part 36, as compared with the control device 30 according to the above embodiment.

The operational information calculating part 41 converts the data received from the operational information detecting device 50 into the operational data, and outputs it to the operational information processing part 37 and the first memory part 38. In detail, the operational information detecting device 50 outputs the data of the amount of rotation and the current value of the servomotor which are detected using the rotation sensors of the arm drives M1-M6 of the robot 10A, and the force data of the force detected using the force sensor 14 to the operational information calculating part 41. The operational information calculating part 41 calculates the position data indicative of the three-dimensional position and the three-dimensional posture of the end effector 11A by integrating the amounts of rotation of all the servomotors of the arm drives M1-M6. The operational information calculating part 41 generates and outputs the operational data which includes the force data and the position data at the same detection time so as to be associated with this detection time.

The image processing part 42 receives the image data indicative of the image captured by the imaging device 70, and performs image processing to this image data. The image processing part 42 extracts the object and the end effector 11A which are included in the image by the image processing, and generates processed image data which is image data of the image including only the object and the end effector 11A. The image processing part 42 associates the processed image data with the imaging time and stores it in the fourth memory part 43. The image processing part 42 may also store image data before the processing in the fourth memory part 43.

The method of extracting images of the object and the end effector 11A from the image may be any kind of known methods. For example, the image processing part 42 may extract the images of the object and the end effector 11A using a feature-based or area-based image matching technique.

For example, in the feature-base case, the image processing part 42 may extract characteristic points, such as edges and corners, in the unprocessed image, and may calculate feature amounts of the characteristic points. Further, based on the feature amounts of the characteristic points, the image processing part 42 may extract the images of the object and the end effector 11A from the unprocessed image by perform a matching of the unprocessed image with templates of the images of the object and the end effector 11A. Further, in the area-based case, the image processing part 42 may identify each area in the unprocessed image based on the edge, the texture, etc. Moreover, based on the identified area, the image processing part 42 may extract the images of the object and the end effector 11A from the unprocessed image by performing the matching of the unprocessed image with the templates of the images of the object and the end effector 11A. The templates of the images of the object and the end effector 11A may be stored beforehand in the fourth memory part 43.

The fourth memory part 43 is implemented by a storage device similar to the first memory part 38 etc. The fourth memory part 43 stores the image data captured by the imaging device 70, the processed image data processed by the image processing part 42, and the templates etc. of the images of the object and the end effector 11A.

Further, the learning part 36A according to this modification carries out the machine learning using the operational information on the robot 10A and the correctional information corresponding to this operational information. Further, the learning part 36A uses the operational information on the robot 10A as the input data and uses the command corresponding to this operational information as the output data. In this modification, the operational information on the robot 10A includes the operational data of the end effector 11A of the robot 10A and the image data of the object captured by the imaging device 70. This image data indicates the operational information on the end effector 11A, such as a spatial relationship between the end effector 11A and the object, and the processing situation of the object by the end effector 11A. In this modification, although the image data is the processed image data by the image processing part 42 after the processing, it may be the image data before the processing. By using the processed image data, it is possible to improve the accuracy of the output of the neural network.

For example, in the neural network of the learning part 36A in the machine learning, the operational data of the end effector 11A and the image data of the object are used as the input data, and the correctional information performed during the detection of these data is used as the teacher data. During the input/output of the data, the neural network accepts the input of the operational data of the end effector 11A and the image data of the object, and outputs the executing operation correction command for causing the robot 10A to perform next.

Figure 10:
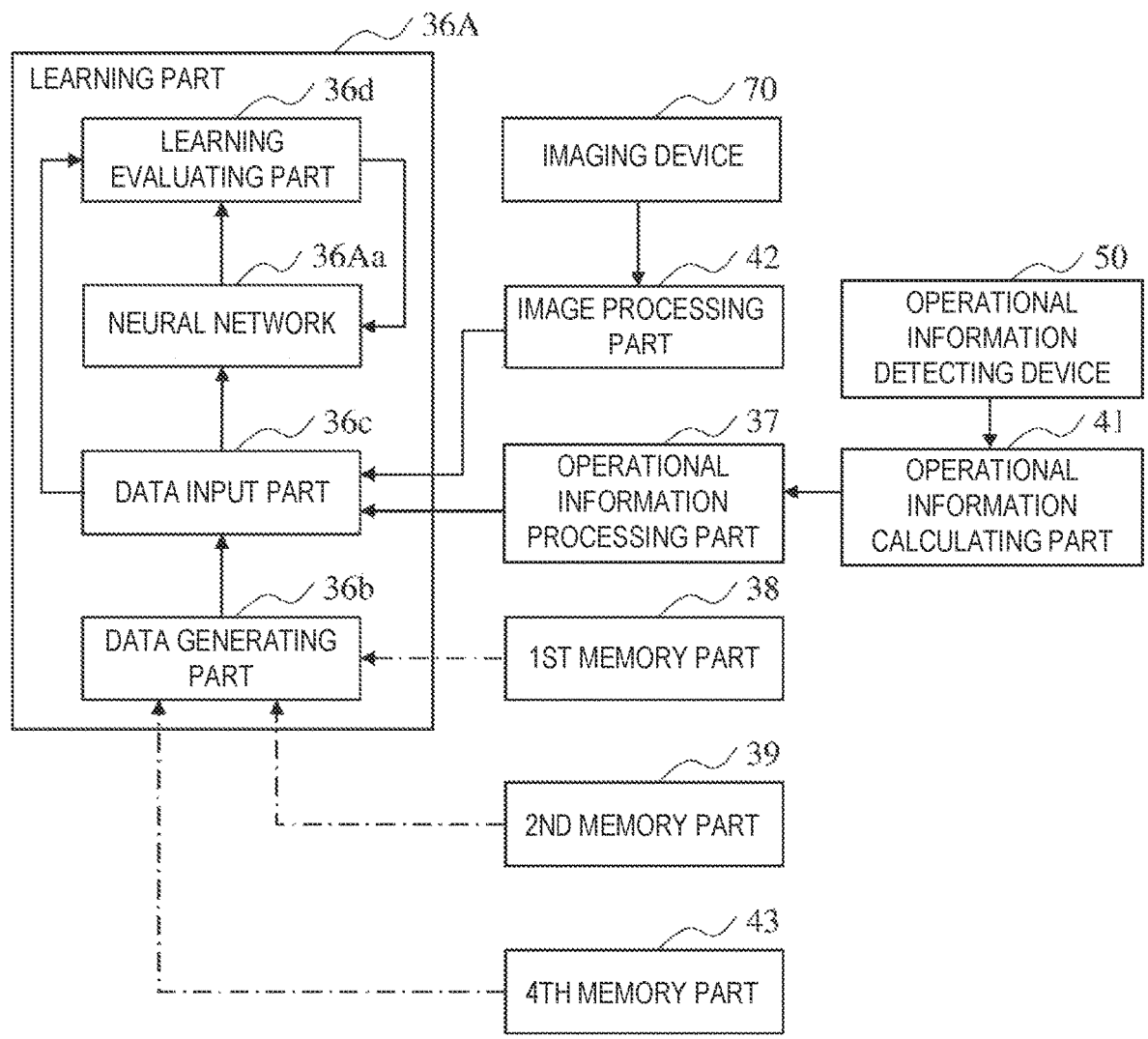
FIG. 10 is a functional block diagram illustrating one example of a configuration of a learning part according to this modification.

One example of a configuration of the learning part 36A is described. FIG. 10 is a functional block diagram illustrating one example of a configuration of the learning part 36A according to this modification. As illustrated in FIG. 10, the learning part 36A includes a neural network 36Aa, the data generating part 36b, the data input part 36c, and the learning evaluating part 36d.

Also in this example, while the robot 10A performs the given operation once, each command and each data are acquired at the given sampling interval. For example, the correctional information detecting part 35 acquires the time series data $Pm_0$-$Pm_u$ of the corrected operational command Pm at this sampling period. The operational information detecting device 50 acquires the detection data of the end effector 11A at this sampling period, and the operational information calculating part 41 acquires the time series data $Pd_0$-$Pd_u$ of the operational data Pd of the end effector 11A by calculating this detection data. Further, the imaging device 70 acquires the image data of the imaged object at this sampling period, and the image processing part 42 acquires time series data $Ip_0$-$Ip_u$ of a processed image data Ip after the image processing by carrying out the image processing of the image data.

The processing of the learning part 36A during the machine learning is described. The data generating part 36b generates time series data $Ld_0$-$Ld_u$ of learning data Ld using the time series data $Pd_0$-$Pd_u$ of the operational data Pd in the first memory part 38, and the time series data $Ip_0$-$Ip_u$ of the processed image data Ip in the fourth memory part 43. The time series data $Ld_i$ is generated using the time series data $Pd_i$ and $Ip_i$. Further, the data generating part 36b generates the time series data $pn_0$-$pn_u$ of the teacher data pn from the time series data $Pm_0$-$Pm_u$ of the corrected operational command Pm of the second memory part 39.

The data input part 36c sequentially inputs the time series data $Ld_0$-$Ld_u$ of the learning data Ld into each neuron of the input layer of the neural network 36Aa. When the input of the time series data $Ld_i$ of the learning data Ld is received at the sampling time $t_i$, the neural network 36Aa estimates and outputs the executing operation correction command $Pn_{i+1}$ at the next sampling time $t_{i+1}$.

The learning evaluating part 36d adjusts the weight between the neurons of the neural network 36Aa based on the time series data $pn_{i+1}$ of the teacher data pn and the executing operation correction command $Pn_{i+1}$ at the sampling time $t_{i+1}$. The data input part 36c and the learning evaluating part 36d perform the processing described above for all the time series data $Ld_0$-$Ld_u$.

The processing of the learning part 36A during the input/output of the data is described. During the operation of the robot 10A, the operational information calculating part 41 detects the operational data $Pd_i$ by using the detection data of the operational information detecting device 50 at the present sampling time $t_i$, and outputs it to the learning part 36A. In parallel with this, the image processing part 42 generates the processed image data $Ip_i$ by using the image data captured by the imaging device 70 at the sampling time $t_i$, and outputs it to the learning part 36A.

The data input part 36c inputs the operational data $Pd_i$ and the processed image data $Ip_i$ into the neural network 36Aa. The neural network 36Aa uses the operational data $Pd_i$ and the processed image data $Ip_i$ as the input data, and outputs the executing operation correction command $Pn_{i+1}$ at the next sampling time $t_{i+1}$ to the operational commanding part 32 as the output data. The operational commanding part 32 generates the executing operational command to which the executing operation correction command $Pn_{i+1}$ is reflected. At each of the sampling time $t_0$ to $t_{u-1}$, the neural network 36Aa performs the processing described above. The processing state of the object is taken into consideration of the processing by such a neural network 36Aa.

Note that, similar to the above embodiment, the neural network 36Aa may be configured to be inputted, as the input data, the operational data $Pd_i$ and the processed image data $Ip_i$ at the sampling time $t_i$, and the operational data $Pd_{i-1}$ to $Pd_{i-n}$ and the processed image data $I_{i-1}$ to $I_{i-n}$ at the past sampling time $t_{i-1}$ to $t_{i-n}$. Since other configurations and operations of the mechanical apparatus system 1A according to this modification are similar to those of the above embodiment, the detailed description is omitted.

2-5. Effects Etc

According to the mechanical apparatus system 1A according to this modification, similar effects to the above embodiment can be obtained. Further, in the mechanical apparatus system 1A, the learning part 36A carries out the machine learning using the operational information on the robot 10A and the correctional information corresponding to this operational information, and uses the operational information on the robot 10A as the input data and uses the command corresponding to this operational information as the output data. The operational information on the robot 10A includes the operational data of the end effector 11A of the robot 10A, and the image data of the object captured by the imaging device 70. By the above configuration, the learning part 36A can output not only the operating state of the end effector 11A but also the state of the object to be processed which is recognized from the image (i.e., can output corresponding to the processing state). For example, when the robot 10A carries out a work, such as painting, welding, chipping, polishing, or sealing, the performance of the work varies according to the state of a part of the object to be processed. The learning part 36A can carry out the output suitable for the state of this part by using the image including this part as the input data. Therefore, the output accuracy of the learning part 36A improves. Note that the learning part 36A which treats the operational information including the image data may be used for any kind of mechanical apparatuses other than robots.

Other Embodiments

As described above, although examples of the embodiment of the present disclosure are described, the present disclosure is not limited to the above embodiment and the modification. That is, various modifications and improvements are possible within the scope of the present disclosure. For example, a mode obtained by applying various modifications to the above embodiment and the above modification, and a mode built by combining components in different embodiments and modifications are also encompassed within the scope of the present disclosure.

For example, although in the above embodiment and the above modification the control devices 30 and 30A correct the operations of the mechanical apparatus 10 and the robot 10A according to the manipulational information outputted from the sole manipulating device 20 during the automatic operating mode, they are not limited to this configuration. The control devices 30 and 30A may correct the operations of the mechanical apparatus 10 and the robot 10A according to the manipulational information outputted from two or more manipulating devices 20. For example, the priority is set for two or more manipulating devices 20, and the control devices 30 and 30A may determine, according to the priority, the manipulational information to be adopted for the correction, from the manipulational information outputted from the two or more manipulating devices 20. Alternatively, the control devices 30 and 30A may perform processing, such as addition, subtraction, averaging, or other statistical procedures, to the manipulational information outputted from the two or more manipulating devices 20, and may adopt the processed manipulational information for the correction.

Further, although in the above embodiment and the modification the manipulating device 20 is provided with the haptics device 23 in order to give the operator the stimulus of perception, it is not limited to this configuration. The manipulating device 20 may be provided with any kind of devices which give the operator the stimulus of perception. For example, the manipulating device 20 may be configured to give the operator at least one of stimuli including tactile sense, thermal sense, vision, and hearing. The manipulating device 20 may give the stimulus of tactile sense by a deformation of the manipulating device 20, such as expansion and contraction, or extension and contraction, and vibration, and, for example, it may be provided with a device which expands and contracts by using air pressure or fluid pressure, and a device which generates vibration, such as a piezoelectric element. The manipulating device 20 may give the stimulus of thermal sense by a generation of heat, and, for example, it may be provided with a heater. The manipulating device 20 may give the visual stimulus by emission and blink of light, and, for example, it may be provided with a light source, such as an LED (Light Emitting Diode). The manipulating device 20 may give the stimulus of hearing by generating sound, and, for example, it may be provided with a speaker.

Further, although in the above embodiment and the modification the information used by the learning parts 36 and 36A for the machine learning is information acquired during the automatic operating mode, in detail, at least the operational data among the operational data as the operational information on the mechanical apparatus 10 and the robot 10A and the image data of the object, and the corrected operational command as the correctional information, it is not limited to this configuration. For example, the learning parts 36 and 36A may use the information acquired during the manual operating mode for the machine learning. For example, such information may be the executing operational command based on the manipulational information of the manipulating device 20, and at least the operational data among the operational data as the operational information on the mechanical apparatus 10 and the robot 10A which are operated according to this executing operational command and the image data of the object. Therefore, since the learning parts 36 and 36A also carry out the machine learning of the operation result of the mechanical apparatus 10 and the robot 10A by the operator, they can carry out the output close to the human operation.

Although in the above modification the robot 10A is the industrial robot, it may be any kind of robots. For example, the robot 10A may be a robot, such as a service robot and a humanoid. The service robot is a robot used in various service industries, such as nursing, medical science, cleaning, guard, guidance, rescue, cooking, and goods offering.

Further, although in the above modification the robot 10A is the vertical articulated robot, it is not limited to this configuration, and, for example, it may be configured as a horizontal articulated robot, a polar coordinate robot, a cylindrical coordinate robot, a Cartesian coordinate robot, a vertical articulated robot, or other robots.

The art of the present disclosure may be a controlling method. For example, the controlling method according to the present disclosure includes operating the mechanical apparatus according to the operational command for operating the mechanical apparatus, correcting the operation of the mechanical apparatus according to the manipulational information outputted from the manipulating device for manipulating the mechanical apparatus, acquiring the first operational information indicative of the operation of the mechanical apparatus and the correctional information indicative of the correction of the operation of the mechanical apparatus, causing the learning model to carry out the machine learning using the first operational information and the correctional information corresponding to the first operational information, inputting the first operational information into the learning model, causing the learning model to output the command corresponding to the first operational information, and operating the mechanical apparatus according to the operational command based on the command of the learning model. The manipulational information is the information based on the second operational information indicative of the motion of the manipulating device. According to this controlling method, similar effects to the mechanical apparatus system etc. described above can be obtained. Such a controlling method may be implemented by a circuit such as a CPU and an LSI, or an IC card, or a sole module.

Further, the art of the present disclosure may be a program for executing the controlling method described above, or may be a non-transitory computer-readable recording medium on which this program is recorded. Moreover, it is needless to say that the program described above can be distributed via a transmission medium, such as the Internet.

Further, all the numbers, such as the ordinal number and the quantity, used in the above are to illustrate in order to concretely describe the art of the present disclosure, and therefore, the present disclosure is not limited to the illustrated numbers. Moreover, the relations of connection between the components are to illustrate in order to concretely describe the art of the present disclosure, and therefore, the relations of connection which realize the functions of the present disclosure are not limited to the relations.

The division of the block in the functional block diagram is one example, and therefore, a plurality of blocks may be realized as one block, one block may be divided into a plurality of blocks, and/or a part of the functions may be transferred to other blocks. Further, the functions of a plurality of blocks having similar functions may be processed by sole hardware or software in a parallel or time-dividing manner.

What is claimed is:

1. A control device for a mechanical apparatus, comprising:
   a motion controller configured to control operation of the mechanical apparatus according to an operational command to operate the mechanical apparatus;
   a correction controller configured to correct the operation of the mechanical apparatus according to manipulational information outputted from a manipulating device configured to manipulate the mechanical apparatus;
   a memory part comprising a first memory part configured to store first operational information indicative of the operation of the mechanical apparatus and including a first time associated with the first operational information during a sampling interval, and comprising a second memory part configured to store correctional information indicative of the correction made by the correction controller and including a second time associated with the correctional information during the sampling interval, the first operational information reflecting a correction made by the correction controller to the operation of the mechanical apparatus in a previous sampling interval; and
   a learning part configured to carry out machine learning using the first operational information and the correctional information corresponding to the first operational information, and, after carrying out the machine learning, uses the first operational information as input data and outputs a correction command based on the machine learning,
   wherein the motion controller controls the operation of the mechanical apparatus according to the operational command based on the correction command of the learning part, and
   wherein the manipulating device outputs the manipulational information based on second operational information indicative of motion of the manipulating device.

2. The control device of claim 1, wherein the manipulating device includes an inertial measurement unit, and outputs the manipulational information based on measurement data of the inertial measurement unit as the second operational information.

3. The control device of claim 1, wherein the manipulating device is configured to be freely movable in arbitrary directions in a three-dimensional space.

4. The control device of claim 1, wherein the first operational information includes force data indicative of a force applied to an object by the mechanical apparatus.

5. The control device of claim 1, wherein the first operational information includes position data indicative of the position of the mechanical apparatus.

6. The control device of claim 1, wherein the first operational information includes image data obtained by imaging an object being processed by the mechanical apparatus.

7. The control device of claim 1, further comprising a processing part configured to output the first operational information to the manipulating device,
wherein the manipulating device includes a haptics device configured to give an operator a feedback of an operating state based on the first operational information as a tactile sense.

8. The control device of claim 1,
wherein the learning part includes a neural network.

9. The control device of claim 8, wherein the first operational information includes a present operation and a past operation of the mechanical apparatus.

10. A control system, comprising:
the control device of claim 1; and
the manipulating device configured to manipulate the mechanical apparatus.

11. A mechanical apparatus system, comprising:
the control device of claim 1;
the mechanical apparatus; and
the manipulating device configured to manipulate the mechanical apparatus.

12. A controlling method, comprising the steps of:
operating a mechanical apparatus according to an operational command to operate the mechanical apparatus;
correcting the operation of the mechanical apparatus according to manipulational information outputted from a manipulating device configured to manipulate the mechanical apparatus;
acquiring first operational information indicative of the operation of the mechanical apparatus and including a first time associated with the first operational information during a sampling interval, and correctional information indicative of the correction of the operation of the mechanical apparatus and including a second time associated with the correctional information during the sampling interval, the first operational information reflecting a correction made by the correction controller to the operation of the mechanical apparatus in a previous sampling interval;
causing a learning model to carry out machine learning using the first operational information and the correctional information corresponding to the first operational information;
after carrying out the machine learning, inputting the first operational information into the learning model and causing the output of a correction command based on the machine learning; and
operating the mechanical apparatus according to the operational command based on the correction command,
wherein the manipulational information is information based on second operational information indicative of motion of the manipulating device.

13. The control device of claim 2, wherein the manipulating device is configured to be freely movable in arbitrary directions in a three-dimensional space.

14. The control device of claim 2, further comprising a processing part configured to output the first operational information to the manipulating device,
wherein the manipulating device includes a haptics device configured to give an operator a feedback of an operating state based on the first operational information as a tactile sense.

15. The control device of claim 3, further comprising a processing part configured to output the first operational information to the manipulating device,
wherein the manipulating device includes a haptics device configured to give an operator a feedback of an operating state based on the first operational information as a tactile sense.

16. The control device of claim 13, further comprising a processing part configured to output the first operational information to the manipulating device,
wherein the manipulating device includes a haptics device configured to give an operator a feedback of an operating state based on the first operational information as a tactile sense.

17. The control device of claim 4, wherein the first operational information includes position data indicative of the position of the mechanical apparatus.

18. The control device of claim 4, wherein the first operational information includes image data obtained by imaging an object being processed by the mechanical apparatus.

19. The control device of claim 5, wherein the first operational information includes image data obtained by imaging an object being processed by the mechanical apparatus.

20. The control device of claim 17, wherein the first operational information includes image data obtained by imaging an object being processed by the mechanical apparatus.

* * * * *